US008265793B2

(12) United States Patent
Cross et al.

(10) Patent No.: US 8,265,793 B2
(45) Date of Patent: Sep. 11, 2012

(54) MOBILE ROBOT FOR TELECOMMUNICATION

(75) Inventors: Matthew Cross, Mason, NH (US); Tony Campbell, Pepperell, MA (US)

(73) Assignee: Irobot Corporation, Bedford, MA (US)

( * ) Notice: Subject to any disclaimer, the term of this patent is extended or adjusted under 35 U.S.C. 154(b) by 977 days.

(21) Appl. No.: 11/862,197

(22) Filed: Sep. 27, 2007

(65) Prior Publication Data

US 2010/0076600 A1 Mar. 25, 2010

Related U.S. Application Data

(60) Provisional application No. 60/974,404, filed on Sep. 21, 2007, provisional application No. 60/895,740, filed on Mar. 20, 2007.

(51) Int. Cl.
*G05B 19/00* (2006.01)

(52) U.S. Cl. ........ 700/259; 700/245; 700/247; 700/248; 700/249; 700/250; 700/251; 700/257; 700/258; 700/260; 700/261; 701/28; 701/117; 701/118; 318/567; 318/568.11; 318/568.12; 318/568.16; 318/568.21; 901/1; 901/2; 901/27; 901/47; 180/8.1; 180/8.6; 180/168

(58) Field of Classification Search ............ 700/49, 700/94, 208, 245, 247, 248, 249, 250, 251, 700/257, 258, 259, 260, 261, 262, 264, 269; 701/28, 117, 118, 200, 208, 213, 215; 318/567, 318/568.11, 568.12, 568.16, 56.21, 568.25; 600/117, 118, 407, 426, 429, 587, 595; 606/1, 606/102, 130, 139; 901/1, 2, 27, 47; 345/156, 345/161; 180/8.1, 8.6, 168

See application file for complete search history.

(56) References Cited

U.S. PATENT DOCUMENTS

| 5,754,631 | A  | * | 5/1998 | Cave   | 379/88.07 |
| 6,549,215 | B2 | * | 4/2003 | Jouppi | 345/660   |
| 6,781,606 | B2 | * | 8/2004 | Jouppi | 345/698   |

(Continued)

FOREIGN PATENT DOCUMENTS

WO WO 2007/041295 A2 4/2007

OTHER PUBLICATIONS

Johns Hopkins Medical Institutions, Dr. Robot Tested at Hopkins, 2003, Internet, p. 1-2.*

(Continued)

*Primary Examiner* — James Trammell
*Assistant Examiner* — McDieunel Marc
(74) *Attorney, Agent, or Firm* — O'Brien Jones PLLC

(57) ABSTRACT

A mobile robot provides telecommunication service between a remote user at a remote terminal and a local user in proximity to the mobile robot. The remote user can connect to the mobile robot via the Internet using a peer-to-peer VoIP protocol, and control the mobile robot to navigate about the mobile robot's environment. The mobile robot includes a microphone, a video camera and a speaker for providing telecommunication functionality between the remote user and the local user. Also, a hand-held RC unit permits the local user to navigate the mobile robot locally or to engage privacy mode for the mobile robot. When NAT or a firewall obstructs connection from the remote terminal to the mobile robot, an Internet server facilitates connection using methods such as STUN, TURN, or relaying.

20 Claims, 25 Drawing Sheets

U.S. PATENT DOCUMENTS

| | | | |
|---|---|---|---|
| 6,842,877 B2* | 1/2005 | Robarts et al. | 715/708 |
| 6,967,958 B2* | 11/2005 | Ono et al. | 370/401 |
| 6,985,480 B2 | 1/2006 | Brown | |
| 6,999,431 B2* | 2/2006 | Rines | 370/328 |
| 7,123,285 B2 | 10/2006 | Smith et al. | |
| 7,228,203 B2* | 6/2007 | Koselka et al. | 700/245 |
| 7,286,474 B2* | 10/2007 | Garg et al. | 370/230 |
| 7,428,216 B2* | 9/2008 | Siddiqui et al. | 370/230.1 |
| 7,626,569 B2* | 12/2009 | Lanier | 345/156 |
| 7,720,572 B2* | 5/2010 | Ziegler et al. | 700/245 |
| 7,957,837 B2* | 6/2011 | Ziegler et al. | 700/258 |
| 2001/0021186 A1* | 9/2001 | Ono et al. | 370/352 |
| 2002/0114318 A1* | 8/2002 | Rines | 370/352 |
| 2003/0003962 A1* | 1/2003 | Vooi-Kia et al. | 455/566 |
| 2004/0008627 A1* | 1/2004 | Garg et al. | 370/235 |
| 2004/0027086 A1 | 2/2004 | Ogawa et al. | |
| 2004/0114581 A1* | 6/2004 | Hans et al. | 370/356 |
| 2005/0050090 A1* | 3/2005 | Kawahata et al. | 707/103 Y |
| 2005/0057699 A1* | 3/2005 | Bowser | 348/734 |
| 2005/0151496 A1 | 7/2005 | Furuta et al. | |
| 2005/0286494 A1* | 12/2005 | Hollatz et al. | 370/352 |
| 2006/0082642 A1 | 4/2006 | Wang et al. | |
| 2006/0182029 A1* | 8/2006 | Kealy et al. | 370/230 |
| 2006/0209794 A1 | 9/2006 | Bae et al. | |
| 2006/0249314 A1 | 11/2006 | Takenaka et al. | |
| 2007/0076729 A1 | 4/2007 | Takeda | |
| 2007/0097963 A1* | 5/2007 | Thermos | 370/352 |
| 2007/0136405 A1* | 6/2007 | Weinstein et al. | 708/130 |
| 2007/0153801 A1 | 7/2007 | Sung et al. | |
| 2007/0159979 A1 | 7/2007 | Butler et al. | |
| 2007/0189311 A1 | 8/2007 | Kim et al. | |
| 2007/0192910 A1* | 8/2007 | Vu et al. | 901/17 |
| 2007/0198128 A1* | 8/2007 | Ziegler et al. | 700/245 |
| 2007/0199108 A1* | 8/2007 | Angle et al. | 901/17 |
| 2008/0084991 A1* | 4/2008 | Chuang et al. | 379/359 |
| 2009/0006555 A1* | 1/2009 | Curran et al. | 709/206 |
| 2009/0129369 A1* | 5/2009 | Turk | 370/352 |
| 2009/0177323 A1* | 7/2009 | Ziegler et al. | 700/259 |
| 2011/0172822 A1* | 7/2011 | Ziegler et al. | 700/259 |

OTHER PUBLICATIONS

Salemi et al., MILO: Personal Robot Platform, 2005, Internet, p. 1-6.*

Nakajima et al., a Multimedia Teleteaching System Using an Electronic Whiteboard for Two-way Communication of Motion Videos and Chalkboards, 1993, IEEE, p. 436-441.*

* cited by examiner

US 8,265,793 B2

MOBILE ROBOT FOR TELECOMMUNICATION

CROSS-REFERENCES TO RELATED APPLICATIONS

This is a non-provisional of U.S. Provisional Patent Application No. 60/974,404 filed Sep. 21, 2007, and further claims the benefit of priority of U.S. Provisional Patent Application No. 60/895,740, filed Mar. 20, 2007, the entire contents of both provisional applications being incorporated herein by reference. In addition, the entire contents of U.S. Patent Application Publication 2007/0198128 to ZIEGLER, published Aug. 23, 2007, and of International Patent Application Publication WO 2007/041295 A2 to CROSS, published Apr. 12, 2007, are also incorporated herein by reference.

TECHNICAL FIELD

Mobile robots may include facilities for moving about a home, office, school, or other location, and may be remotely operated by a remote user for observing the environment of the robot or for communicating with a local user.

BACKGROUND

Robots have been used for facilitating videoconferencing and remote communication. For example, U.S. Pat. No. 7,123,285 to SMITH (the entire contents of which are incorporated herein by reference) relates to a system including a robot having a swiveling video monitor, a speaker and a microphone, and a remote terminal unit having a microphone and a camera. In accordance with SMITH, a user at the remote terminal unit can operate the robot while voice and video signals are sent to the robot to be output on the robot's speaker and video monitor. The swiveling video monitor of the robot in SMITH can also be operated via the remote terminal unit.

In US Patent Application Publication 2006/0082642 to WANG, published Apr. 20, 2006 (the entire contents of which are incorporated herein by reference), a robot is used for two-way mobile teleconferencing between the robot and a remote control station. The remote control station of WANG communicates with the robot through a network, receiving video input from a camera on the robot, and the user at the remote control station can move the robot using the remote control station.

As another example, robots have also been used for companionship and remote caregiving. A mobile robot capable of facilitating telecommunication between a remote caregiver and a person in a home or other location, inter alia, is disclosed in US Patent Application Publication 2007/0192910 to VU, published Aug. 16, 2007 (which is incorporated herein by reference).

In order for the remote user to operate a mobile robot located in a home, building, or other location (such locations herein referred to as "premises") distant from the remote user's location, a communicative channel is provided therebetween. Typically, at the premises where the mobile robot is located, there may be public telecommunication service connections that may be used as the communicative channel; such as, for example, the public switched telephone network ("PSTN"), cable television ("cable"), satellite television ("satellite"), and/or campus wireless Ethernet services ("WiFi"). At the remote user's location, which may be a home, an office, or a hotel, inter alia, there may be similar connectivity. Alternatively, the remote user may have access to mobile telephone-type service (such as GSM, CDMA, 3G, or the like) over which Internet communication is provided. Thus, one approach for connecting a remote terminal to a mobile robot is via an Internet protocol using universal datagram packet (UDP), transmission control protocol (TCP), and/or internet protocol (IP).

However, because many homes having a broadband connection to the Internet utilize a firewall or a network address translation system (hereinafter, "NAT")—collectively referred to as a "firewall" hereinafter—difficulties can occur when the remote terminal attempts to connect to the mobile robot. One such difficulty arises because many firewalls prevent direct connections initiated by Internet hosts not protected by the firewall (hereinafter, "outside hosts") to reach hosts located behind (i.e., protected by) the firewall (hereinafter, a "firewalled host"). Therefore, when the mobile robot is a firewalled host that is sequestered from incoming Internet connections originating beyond the firewall, it may not be possible for the remote terminal to initiate a direct connection with the mobile robot.

STUN and TURN are technologies that enable some incoming Internet connection initiation requests to "traverse" the firewall or NAT and successfully connect to firewalled hosts (see, for example, US Patent Application Publication 2007/0076729 A1 to TAKEDA, published Apr. 5, 2007; 2006/0209794 to BAE, published Sep. 21, 2006; and US Patent Application Publication 2007/0189311A1 to KIM, published Aug. 16, 2007, each of which are incorporated herein by reference). Nonetheless, even employing STUN and/or TURN, some kinds of incoming connection attempts may fail to reach firewalled hosts in certain kinds of network arrangements using a firewall or NAT.

For these reasons, among other, there has remained significant unmet demand for connecting a remote terminal to a mobile robot at a home or other such premises.

SUMMARY

In view of the above, as well as other considerations, presently provided is a mobile robot for performing telecommunication and remote observation, inter alia. The mobile robot may include at least one sensor and a privacy controller for preventing operation of the sensor when the local user causes the robot to operate in a privacy mode. The sensor may include a camera and/or a microphone, for example. The mobile robot may further include a wireless network interface for communicating with a base station, and a communication controller for transmitting and receiving audio and/or video data, in which the communication controller controls the mobile robot so as to prevent transmission of data from the sensor when the mobile robot operates in the privacy mode. The mobile robot may also be usable with an RC unit for operating the mobile robot locally via a wireless signal transmitted to the mobile robot.

In accordance with another aspect, a robot system may include a base station and a mobile robot, the base station including a base station wireless transceiver for communicating with the mobile robot via a local wireless connection and a premises Internet connection for interfacing with the Internet, the mobile robot including a robot wireless transceiver capable of communicating with the base station via the local wireless connection.

DETAILED DESCRIPTION

Figure 4:
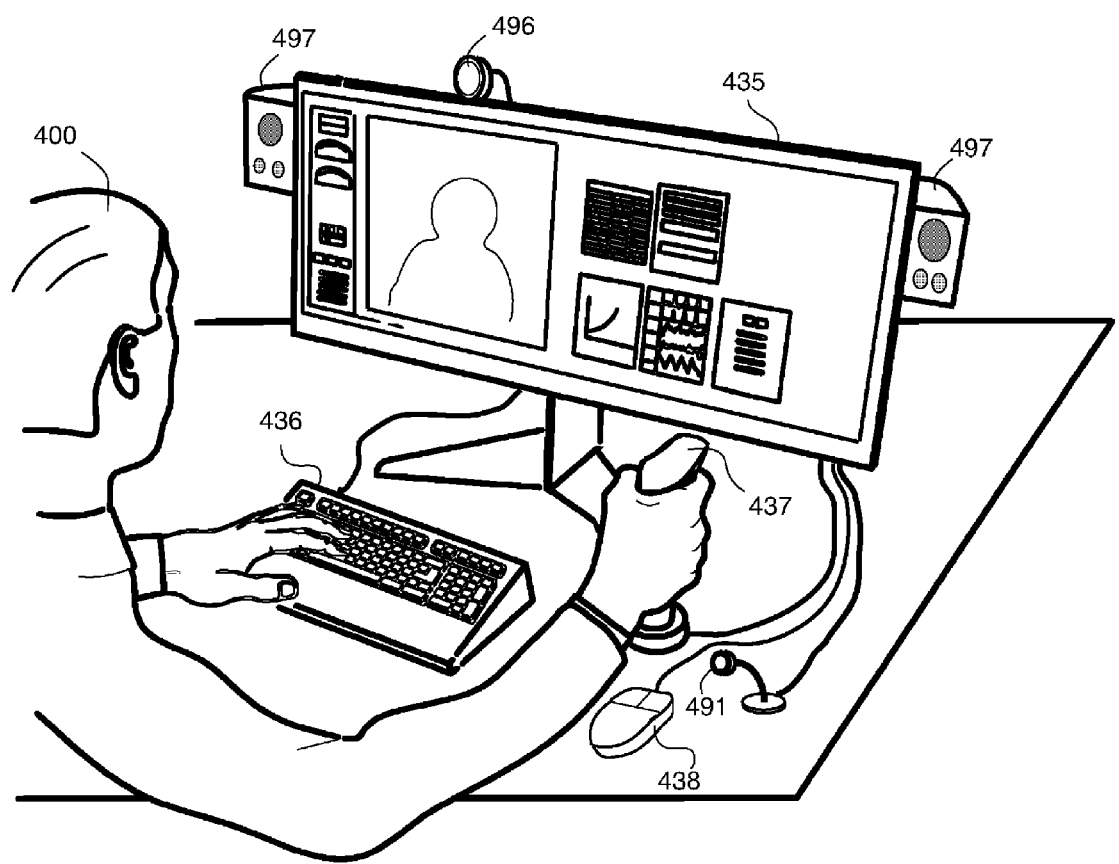
FIG. 4 is a perspective view of a remote user terminal.
Figure 5:
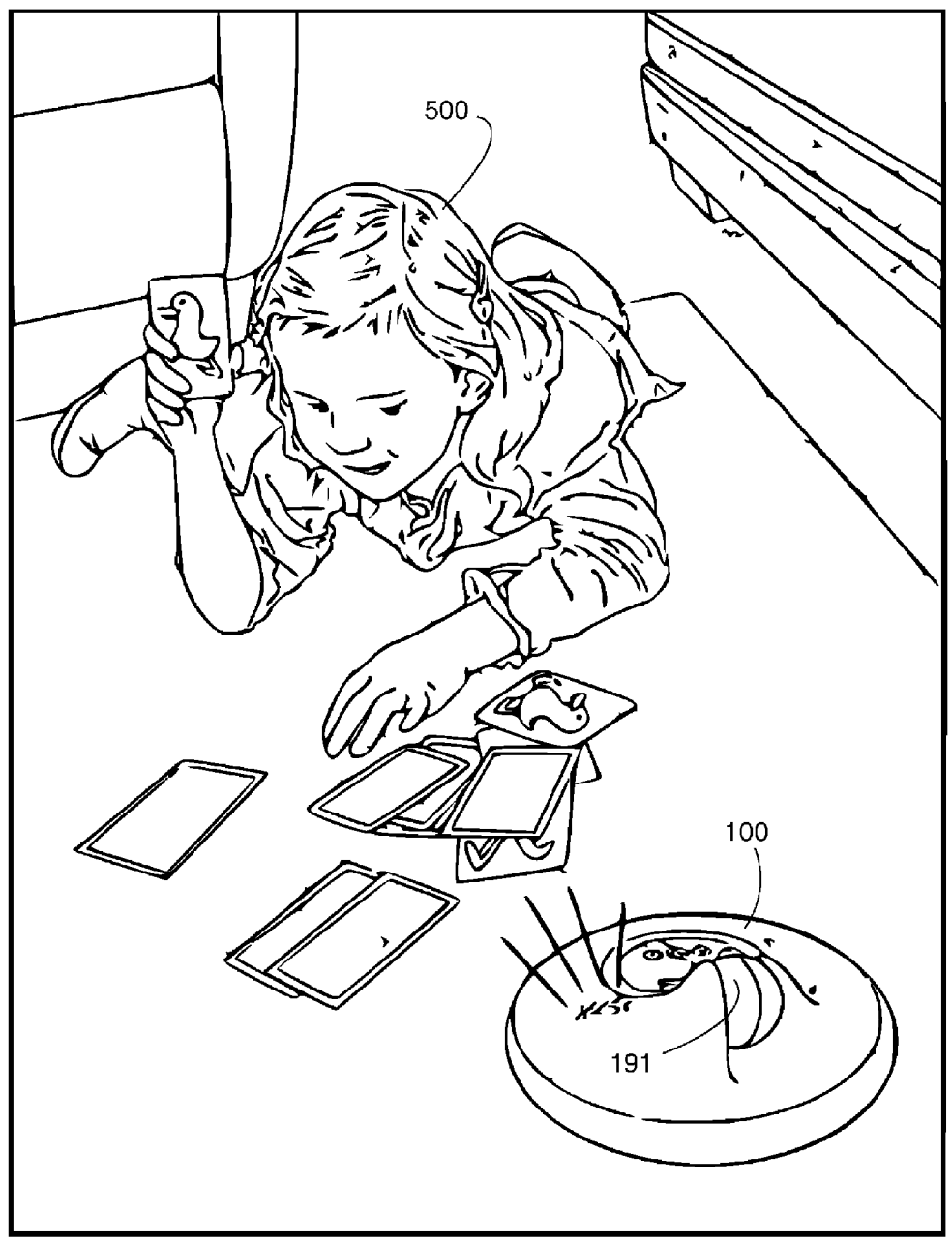
FIG. 5 is a perspective view of a mobile robot facilitating telecommunication with a local user.
Figure 6:
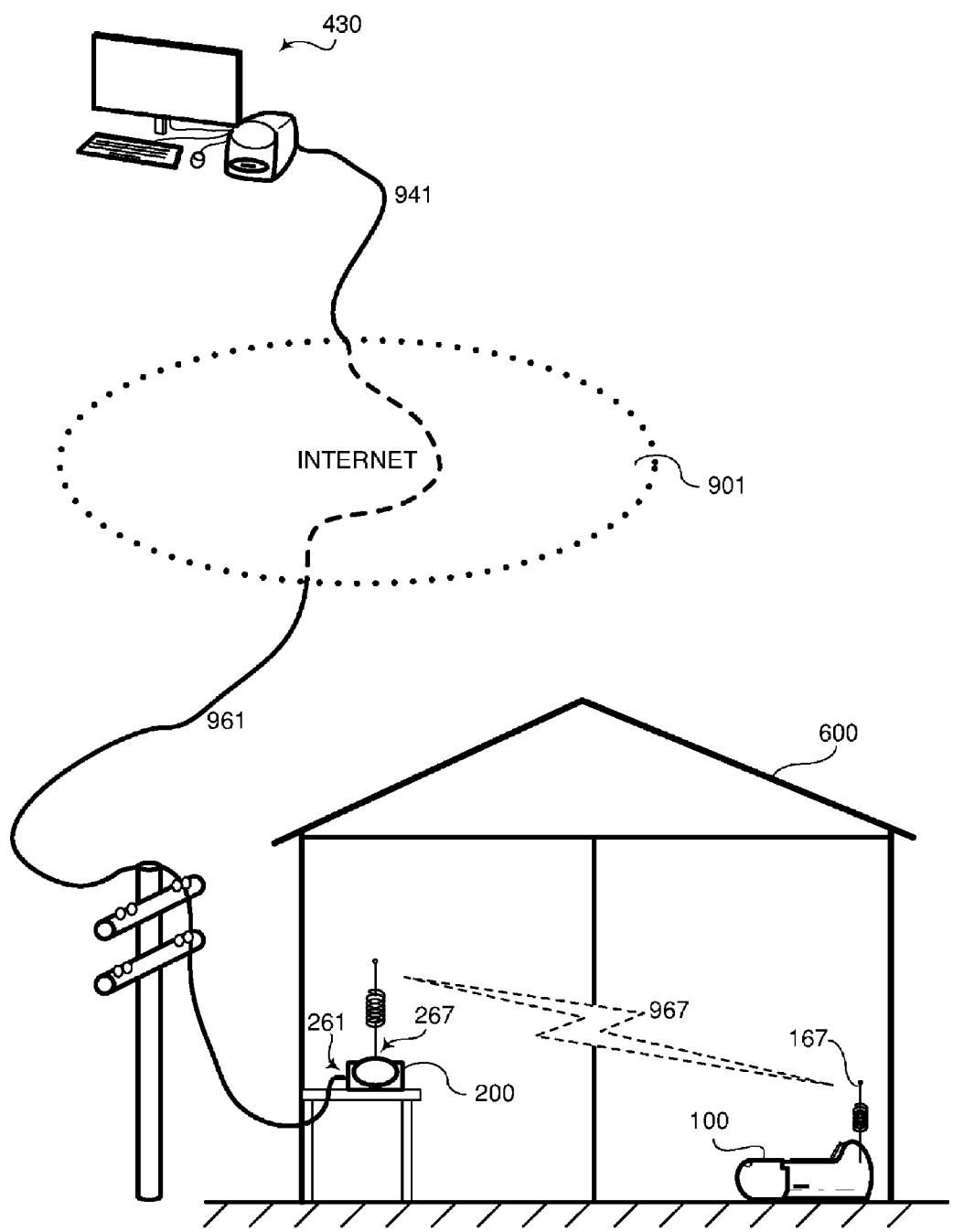
FIG. 6 is an illustrative diagram of a robot telecommunication system using peer-to-peer VoIP connection between a remote terminal and a mobile robot.

In accordance with a first example implementation, as illustrated in FIGS. 4, 5 and 6, a robot telecommunication system is provided including a mobile robot 100 at a local premises 600 and a remote terminal 430 at a remote location, in which a remote user 400 can operate the mobile robot 100 using the remote terminal 430. The remote location may be located beyond at least one minute's walk from the mobile robot 100, in accordance with one example implementation; or, the remote location may be located at least 100 meters away from the mobile robot 100, in accordance with another implementation. Alternatively, the remote location may in fact be located quite near the mobile robot 100, in terms of physical distance—even within the same home or building, or the same room—in accordance with another example implementation.

Figure 1:
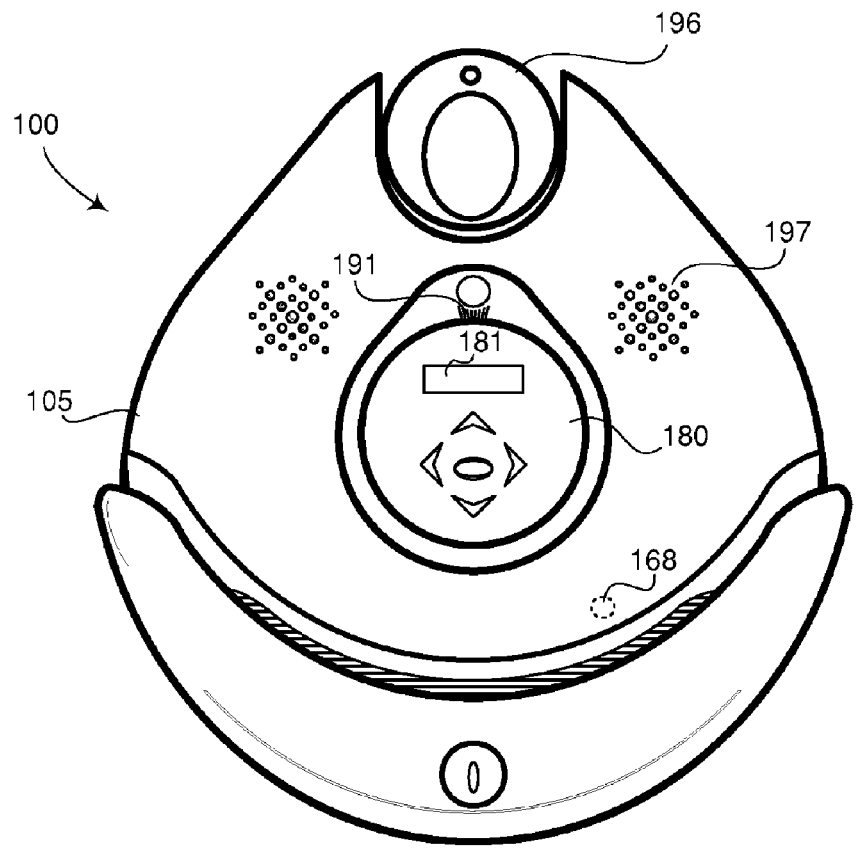
FIG. 1 is a plan view of a mobile robot.
Figure 2:
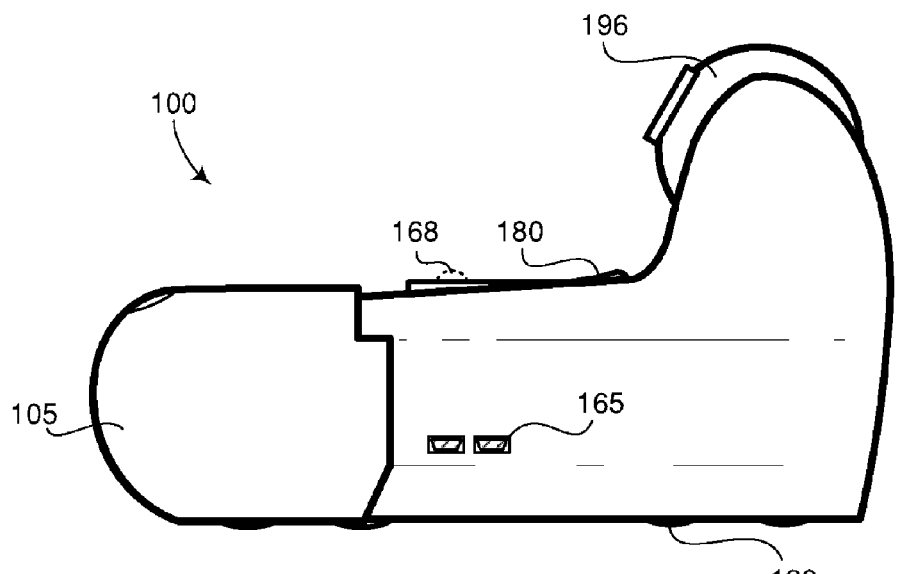
FIG. 2 is a profile view of the mobile robot shown in FIG. 1.

Referring to FIGS. 1 and 2 to illustrate an example implementation, the mobile robot 100 includes one or more telecommunication sensors, such as a robot microphone 193 for inputting voice or sound data, or a camera 191 for inputting image data. The sound data or image data originating from the robot's telecommunication sensors is referred to herein as "local telecommunication data." Preferably, the mobile robot 100 also includes one or more telecommunication output devices, such as a speaker 194 for outputting voice or sound data received from the remote terminal, or a liquid crystal display screen ("LCD") 181 for displaying image data received from the remote terminal 430. The sound or image data received from the remote terminal 430 is referred to herein as "remote telecommunication data."

The mobile robot may have a chassis 105 (also referred to herein as a main body) including a docking connector for interfacing with a base station or recharging station (also referred to herein as a "docking station"), and a user interface disposed on the chassis for interacting with a local user. Furthermore, the mobile robot 100 includes a drive system 130 for propelling and steering the mobile robot 100 in accordance with user input. In accordance with at least one example implementation, the mobile robot 100 may further include features similar to any of those discussed in ZIEGLER, VU, or SMITH, as well as any of the robots discussed below in reference to the other incorporated documents, such as with respect to the drive system, chassis, form factor, electronics, and/or other aspects.

In at least one implementation, as illustrated in FIG. 6, the robot system includes a base station 200 located at the local premises 600 within communicative range of the mobile robot 100, such as in a room 611A of a home. The base station 200 communicates with the Internet 901 via a premises Internet connection 961, such as a digital subscriber line ("DSL") or cable modem, and communicates with the mobile robot 100 using a local wireless connection 967 via a base station wireless transceiver 267. The local wireless connection 967 may include a radio-frequency ("RF") data network protocol such as wireless Ethernet ("WiFi") conforming to IEEE 802.11a, 802.11b, IEEE 802.11g, IEEE 802.11n, or other suitable standard, for example (see, for example, "Standard for Information Technology-Telecommunications and information exchange between systems-Local and metropolitan area networks-Specific Requirements—Part 11: Wireless LAN Medium Access Control (MAC) and Physical Layer (PHY)," published by IEEE, 1999, which is incorporated herein by reference.) The mobile robot 100 in this example correspondingly includes a robot wireless transceiver 167 for communicating with the base station 200.

The mobile robot 100 may also include a tether port 165 for connecting to the base station 200 using a wire or cable. The mobile robot 100 may additionally include software for enabling the local user 500 to set configurable features of the mobile robot 100, such as during an initial set-up phase when the mobile robot 100 is first used. In accordance with one example implementation, the tether port 165 includes an RJ45 port for connecting to the base station 200 using an Ethernet cable (e.g., unshielded twisted pair, "UTP"). In accordance with an alternative example, the tether port 165 includes a universal serial bus ("USB") port; and in another example implementation, an IEEE 1394-compatible port. The mobile robot 200 receives an IP address using DHCP and may be accessed using the HTTP protocol on a local network via the base station 200 and the tether port 165, in accordance with at least one example implementation.

As an advantage, during initial setup or subsequent re-setup, security settings (WEP or RADIUS security codes, passwords, or the like) or other parameters for enabling the mobile robot 100 to communicate with the base station 200 via the local wireless connection 967 can be established using the wired tether port connection to the base station 200, and potential frustrations of wireless network setup may be alleviated.

Figure 22:
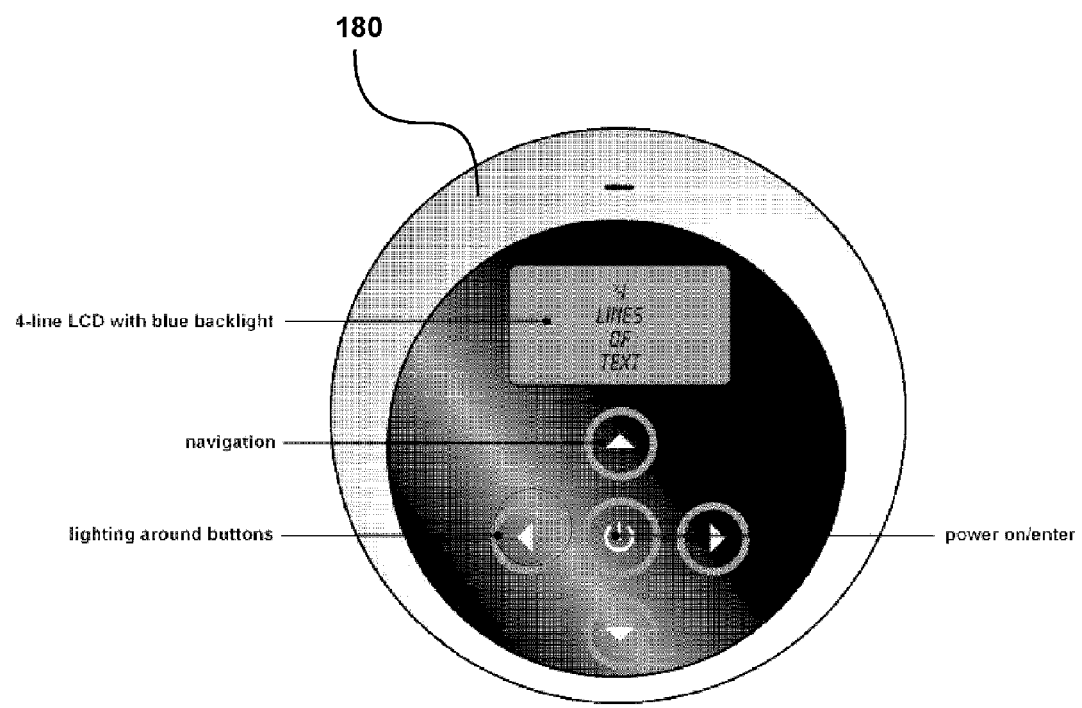
FIG. 22 is a perspective view of an example on-board user interface of a mobile robot.

In accordance with another example implementation, as illustrated in FIG. 22, the mobile robot 100 may include an on-board user interface 180 including an LED or LCD display 181 (which may include a seven-segment display, or a four-line character-based LCD display, as non-limiting examples), and an input device such as a keypad, as illustrated in FIG. 1. Initial setup of the mobile robot 100, such as establishing behavioral settings or wireless network parameters, inter alia, may be carried out by the local user 500 using the on-board user interface 180, without needing to use a personal computer, for example.

FIG. 4 illustrates a remote terminal 430 including a PC having a remote microphone 491 for inputting remote telecommunication data to be sent to the mobile robot 100 and a remote speaker 497 for outputting local telecommunication data received from the mobile robot 100. The remote terminal 430 may also include additional input hardware such as a remote camera and/or additional output hardware such as a remote display 435 (e.g., a computer monitor) for use with telecommunication. The remote terminal communicates with the Internet 901 through a remote terminal Internet connection (such as, for example, cable modem, DSL transceiver, PPP over PSTN, WiFi, T1, CDMA, or GSM).

In addition to telecommunication data, the remote terminal 430 includes robot control input devices such as a keyboard 436, joystick 437, and/or mouse 438. The remote display 435 can display robot control data, such as robot telemetry, battery status, and the like. By manipulating the robot control input devices 436, 437, the remote user 400 causes the remote terminal 430 to transmit a robot control signal to the base station 200 via the Internet 901. The robot control signal may include commands instructing the mobile robot 100 to turn, to move forward, to cause a manipulator or effector to operate (e.g., such as commanding a robotic arm to grasp an object, or commanding a robot camera-aiming mechanism to change the viewing angle of the robot camera 196), or to perform other actions in accordance with remote user input.

The base station 200 may include a base station controller, such as a microprocessor or microcontroller, for intermediating and processing data exchanged between the remote terminal 430 and the mobile robot 100. The base station 200 receives the local telecommunication data sent from the mobile robot 100 via the local wireless connection 967. If the local telecommunication data is already encoded in accordance with a suitable protocol, the base station 200 may forward the local telecommunication without additional processing. Otherwise, if the local telecommunication data is not yet encoded, or is encoded in a format incompatible with the remote terminal 430, the base station 200 may then encode it using an appropriate media protocol (such as MPEG, WAV, AVI, Ogg Vorbis/Ogg Theora, etc.) and forward the encoded local telecommunication data to the remote terminal 430 over the Internet 901. Similarly, the base station 200 may receive remote telecommunication data from the remote terminal 430 via the premises Internet connection 961, perform decoding if the received data is not in a format or protocol compatible with the mobile robot 100, and then forward the remote telecommunication data to the mobile robot 100 using the local wireless connection 967.

Voice-over-IP ("VoIP") refers to technologies and standards for transmitting media (such as sound and/or video, inter alia) over data networks using Internet protocols. Examples of VOIP protocols include SKYPE, VONAGE, SIP, and ITU H.323 (see, for example, US Patent Application Publication 2007/0153801A1 to SUNG, published Jul. 5, 2007, which is incorporated herein by reference). In some VOIP implementations (such as SKYPE and VONAGE, among others), Internet-based VOIP terminals (such as personal computers—"PCs"—running VOIP software and having appropriate hardware such as a a microphone and speaker, and/or a camera and video display; as well as VOIP-specific equipment such as SIP telephones) are assigned ENUM- or DUNDi-compatible telephone numbers, and can receive incoming telephone calls even from non-VOIP telephones operating on the PSTN. See, for example, the discussion of Skype set forth in US Patent Application Publication 2007/0159979 to BUTLER, published Jul. 12, 2007, the entire contents of which are incorporated herein by reference.

The local and remote telecommunication data may be encoded and exchanged using a VoIP protocol. For example, the mobile robot 100 and the remote terminal 430 may encode the local telecommunication data using a CODEC according to the Session Initiation Protocol ("SIP"; see, for example, RFC3261 published by the Internet Engineering Task Force). Alternatively, any other VoIP standard suitable for establishing connections and encoding data for exchange between Internet-connected telecommunication devices may be used, such as H.323 and/or related standards.

In addition, the robot control signal generated as a result of robot control input from the remote user 400 may also be encoded (or "piggybacked") using the same VoIP standard that is used to exchange the local and remote telecommunication data. In accordance with one example implementation, the remote terminal 430 may include a PC executing software for telecommunication in accordance with the SIP standard. While the remote telecommunication data generated from the remote microphone 491 and/or the remote camera are encoded using a CODEC (e.g., MPEG or WAV) and transported over the Internet 901 to the base station 200 and relayed to the mobile robot 100 as a first Real-time Transport Protocol (RTP) data stream, the robot control signals input from the keyboard 436 and/or joystick 437 may also be transmitted using the same SIP session as a second RTP data stream, simultaneously.

As discussed, firewall or NAT devices can obstruct incoming Internet connection initiation requests and prevent them from reaching a firewalled host. However, NAT or firewall traversal may be accomplished for some VoIP protocols by opening a "pinhole" (also referred to as "hole-punch") port in the NAT or firewall. Typically, a VoIP session—such as an SIP stream—can then be "tunneled" through the NAT pinhole to reach the firewalled host. However, in some circumstances, a separate pinhole must be opened for each protocol or session that will be sent through the NAT or firewall; and in some cases, the number or type of pinholes that may be opened in the NAT or firewall may be limited. Accordingly, it can be advantageous to encode both the telecommunication data and the robot control signal using a common SIP session that is tunneled through a firewall pinhole. Or, as one alternative example implementation using the H.323 protocol, the remote telecommunication data may be encoded using a CODEC in accordance with a suitable standard (such as H.261, H.263, or H.264, inter alia) and transported to the mobile robot 100 over a first "channel" within the H.323 session; while a second H.323 channel is opened within the same H.323 session to transport the robot control signal.

As a further advantage, the remote user 400 may connect to the mobile robot 100 at the local premises 600 by simply calling a telephone number associated therewith, using a VoIP device such as a SIP phone or a PC, without having to necessarily use a specialized software application. Once the call connection is established using the VoIP protocol, both the robot control signal and the telecommunication data can be exchanged with the mobile robot 100 via one common VoIP session, as an example.

Figure 20:
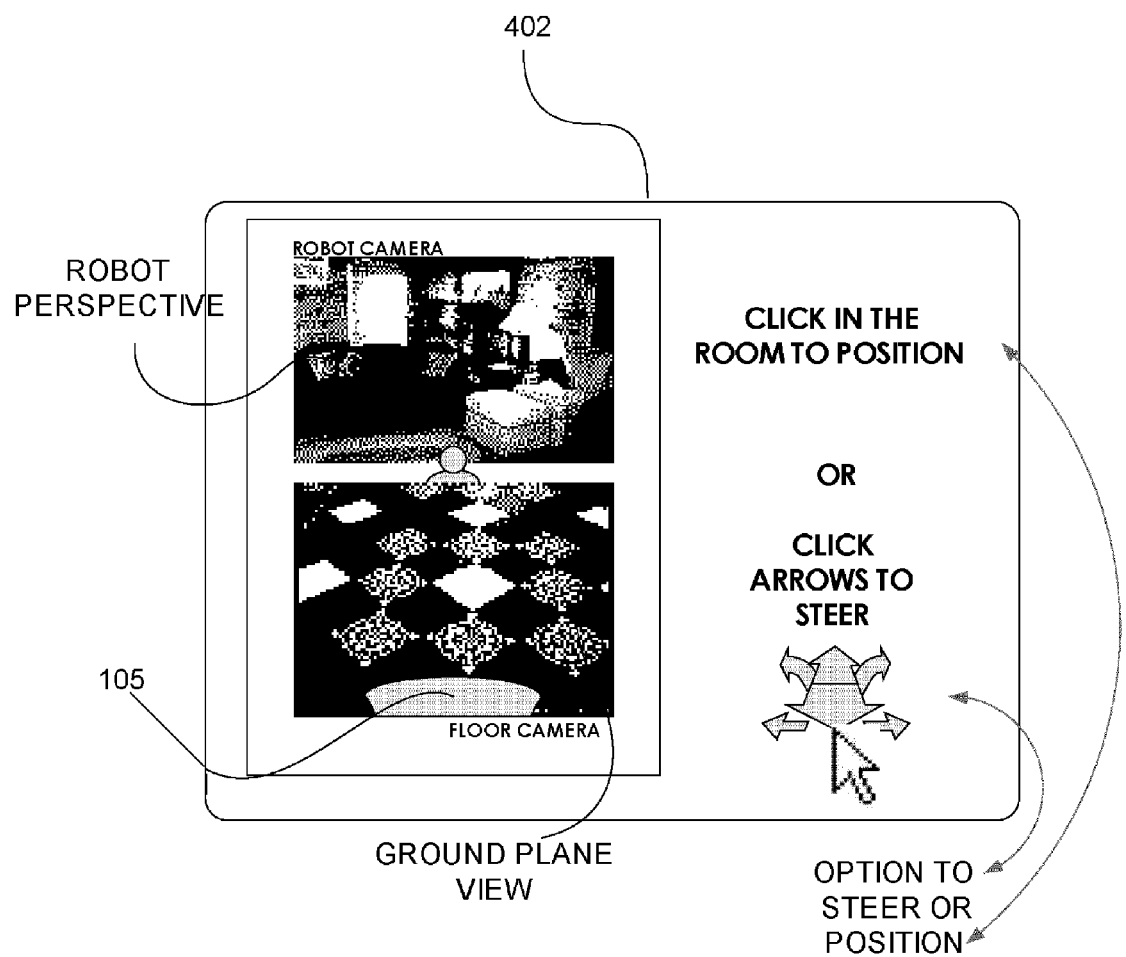
FIG. 20 is a diagram illustrating a first example user interface for controlling a mobile robot.
Figure 21:
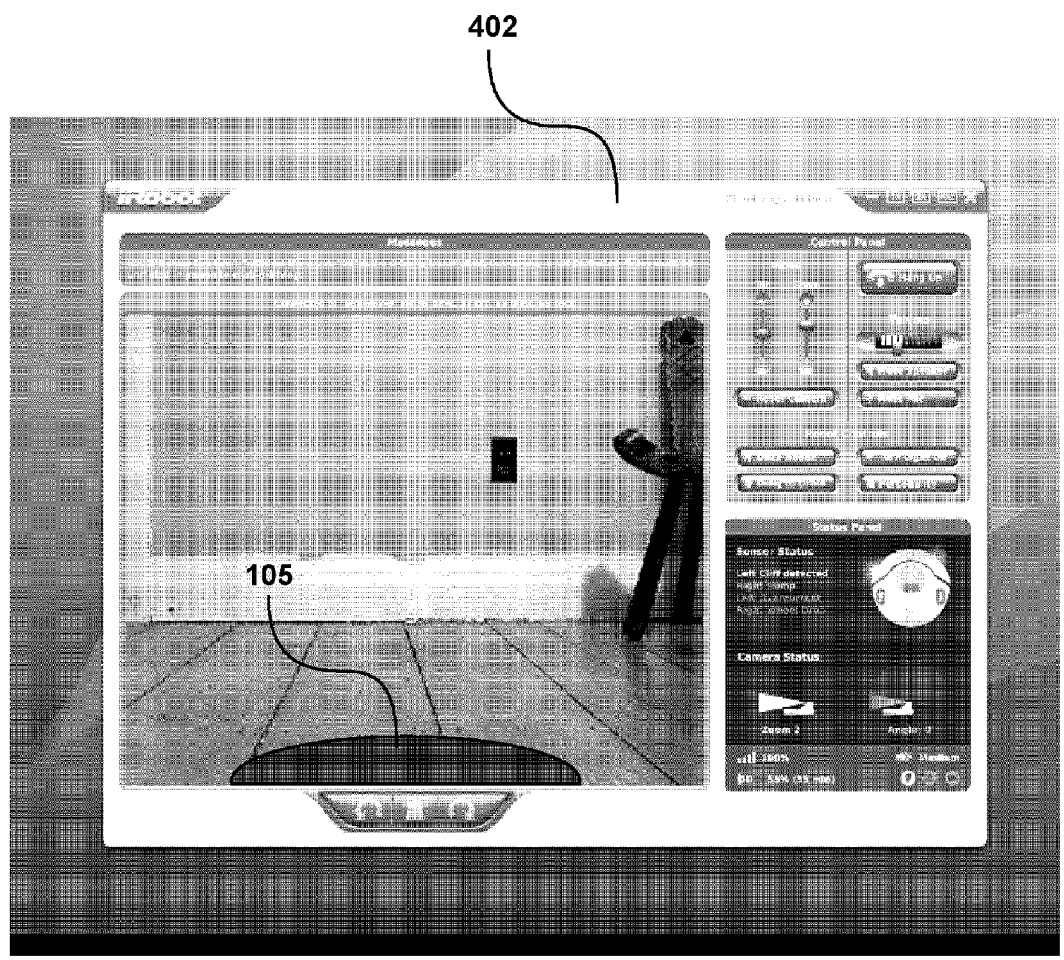
FIG. 21 is a diagram illustrating a second example user interface for controlling a mobile robot.

FIGS. 20 and 21 illustrate example user interfaces for display on a remote terminal 430. In FIG. 20, the user interface includes a video window for displaying the local video data received from the robot camera of the mobile robot 100, and a navigation input area for enabling the remote user 400 to control steering and mobility of the mobile robot 100 by clicking on arrows corresponding to directions. As illustrated in FIG. 21, the video window may include a navigation reference, such as a portion of the chassis 105 of the mobile robot 100, within the viewing area displayed in the video window. As a benefit, the remote user can ascertain size and perspective for judging speed of motion and/or potential obstacles when navigating the mobile robot 100.

Figure 3:
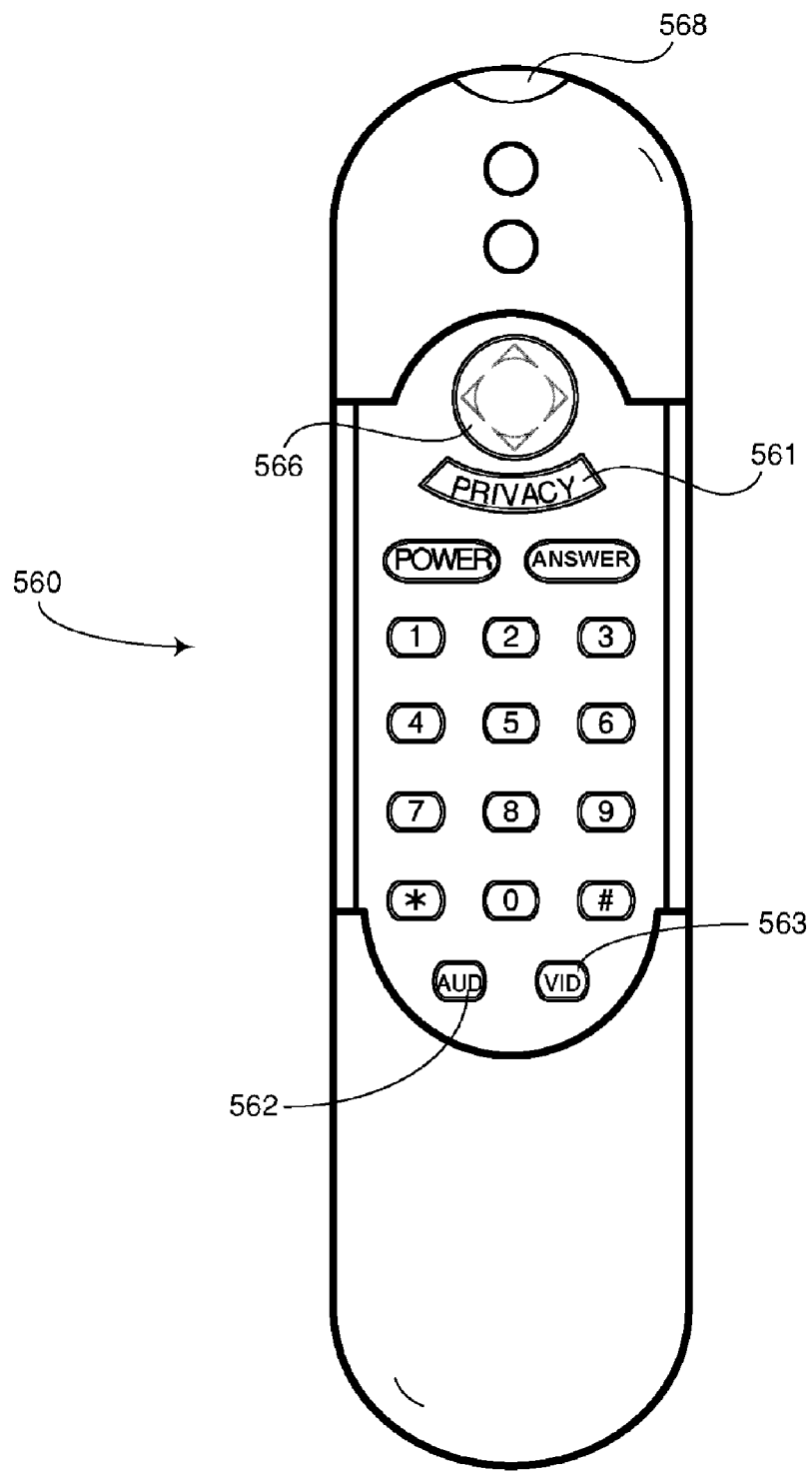
FIG. 3 is a plan view of an RC unit.

FIG. 3 illustrates an infrared local control wand, herein referred to as an "RC unit" 560, for enabling a local user 500 (see FIG. 5) to control the mobile robot 100 locally. The RC unit 560 may include a form factor and features for enabling the local user 500 to hold the RC unit 560 in his or her hand and operate one or more buttons 561, 562, 563 or other input mechanisms (such as pressure-sensing pads, a directional keypad 566, a joystick, or a touch-sensitive LCD screen, as non-limiting examples). A local control signal 968 is generated by the RC unit 560 based on the input from the local user 500 and transmitted to the mobile robot 100. In one example implementation, the RC unit 560 includes an RC transmitter 568 such as a light-emitting diode that emits light in the infrared spectrum ("infrared LED"), and which transmits the local control signal 968 encoded as a pattern of pulses of infrared light. The mobile robot 100 may include a corresponding local control receiver 168 (such as an infrared light sensor) for receiving the local control signal 968. As example alternatives, the RC transmitter 568 may include a radio-frequency transmitter and/or antenna, or an LED that emits light in the visible spectrum, inter alia. In accordance with one example implementation, the RC transmitter 568 includes a wireless transmitter that functions within the local user's line-of-sight.

Figure 17:
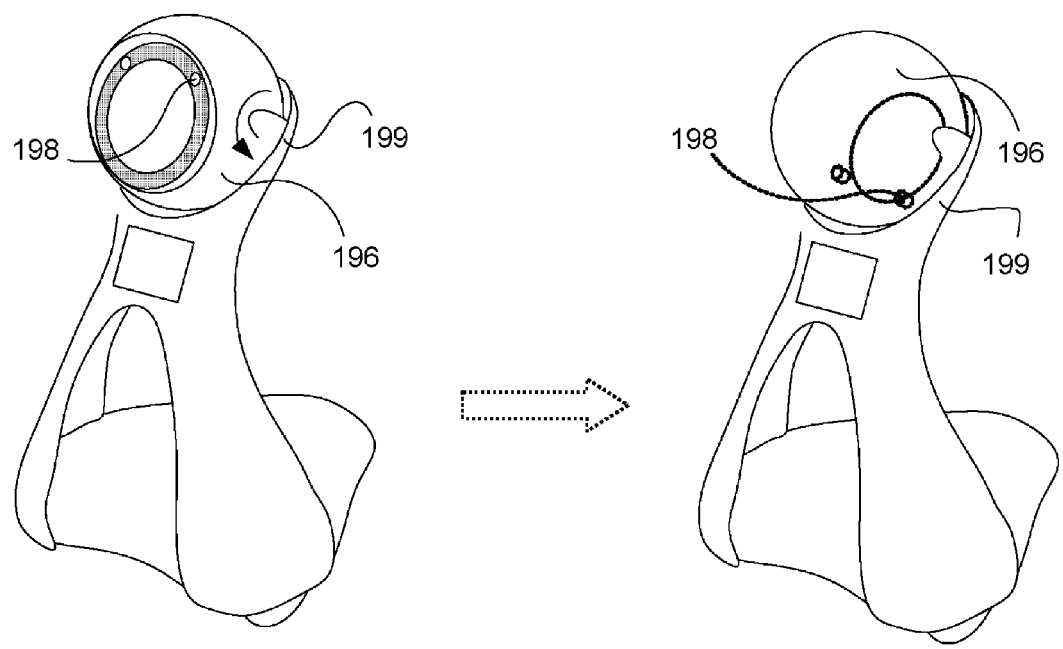
FIG. 17 is a perspective view of a robot camera in an active position.
Figure 18:
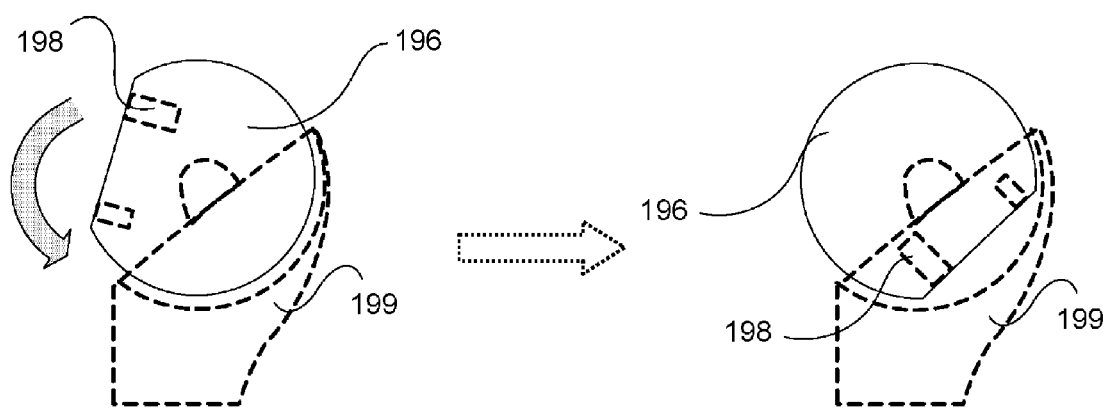
FIG. 18 is a perspective view of the robot camera of FIG. 17, in a disabled position.

The RC unit 560 may include a privacy button 561 for initiating a privacy mode of the mobile robot 100, and also may include an audio mute button 562 and a video mute button 563 for disabling audio or video telecommunication, respectively. When the mobile robot 100 receives a local control signal 968 indicating that the privacy button 561 has been operated, the mobile robot initiates the privacy mode by causing the robot camera 196 to move into a conspicuously disabled orientation, for example, and also by disabling the robot microphone 191 (see, for example, FIGS. 17 and 18). In one example implementation, the mobile robot 100 may also disable the speaker 197 when the privacy button 561 is operated. In another example implementation, the mobile robot 100 may not disable the robot microphone 191, but instead prevent any data generated by the robot microphone 191 from being transmitted to the remote terminal 430. The mobile robot may include a second robot camera for example. In accordance with at least one example implementation, as illustrated in FIGS. 17 and 18, the mobile robot may include a wide angle camera 196 for viewing a wide field around the mobile robot, and a narrow angle (or infrared) camera 198 for viewing a focused area around the mobile robot. The user may toggle the view between the wide angle camera 196 and the narrow angle camera 198, for example; or, the user interface may display data from both the wide and narrow angle cameras, as one alternative example.

The RC unit 560 may also enable the local user 500 to navigate the mobile robot 100 by operating a navigation control mechanism 566. Furthermore, the RC unit 560 may include a "call out" button to initiate outgoing telecommunication connections from the mobile robot 100. In one implementation, when a telecommunication session (e.g., a phone call) has ended, but the local user does not hit the "privacy" button within a particular span of time, then the mobile robot 100 automatically enters the privacy mode.

Figure 15:
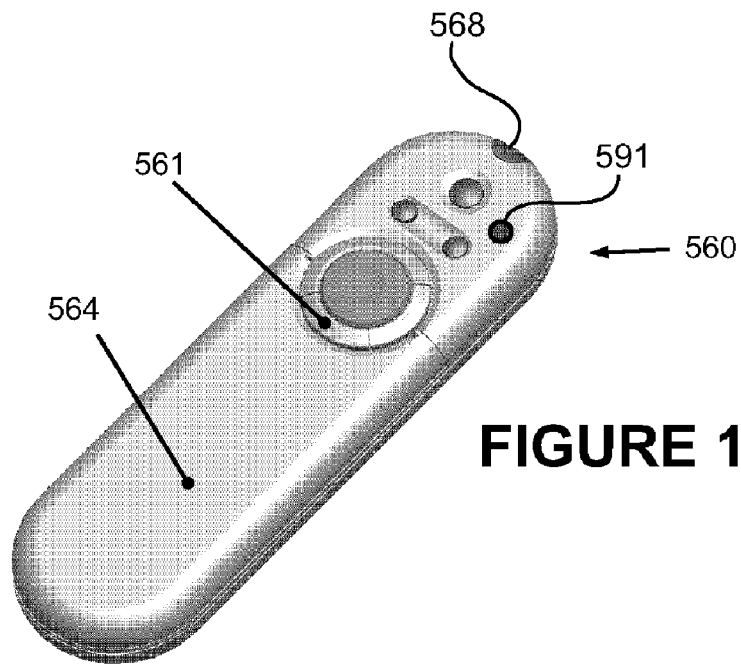
FIG. 15 is a perspective view of an RC unit having a sliding cover in the closed position.
Figure 16:
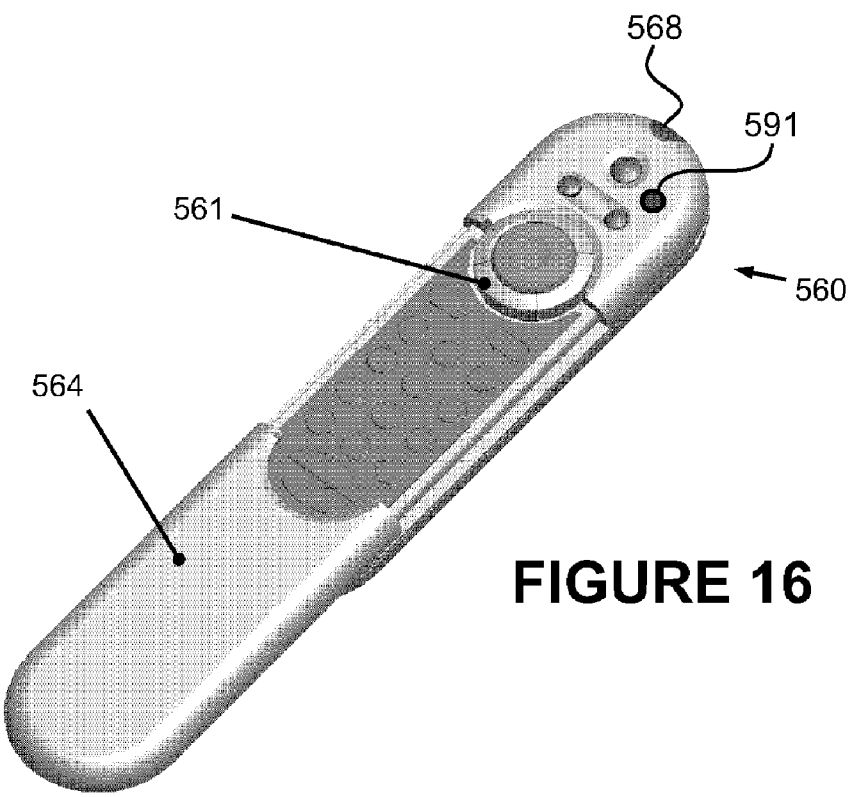
FIG. 16 is a perspective view of the RC unit of FIG. 15, having a sliding cover in the open position.

In one embodiment, as illustrated in FIGS. 3, 15 and 16, the RC unit includes a sliding cover 564 that can slide between an open position and a closed position. As shown in FIGS. 15 and 16, the privacy button 564 may be disposed in a location such that, and/or the sliding cover 564 may have a shape such that, the privacy button 564 remains exposed and/or operable by a user when the sliding cover 564 is open and also when the sliding cover 564 is closed. As an advantage, the user can quickly operate the privacy button 561 to engage the mobile robot's privacy mode even when the sliding cover 564 RC unit 560 is closed.

Figure 13:
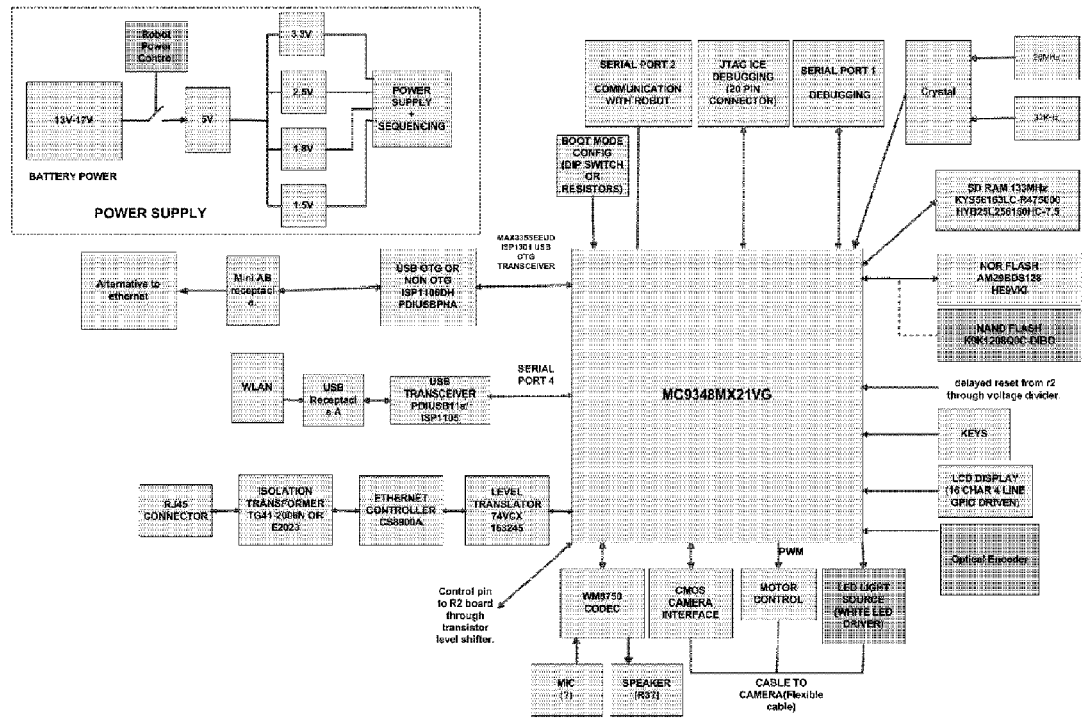
FIG. 13 is a schematic diagram of an example component organization of a mobile robot.

The mobile robot 100 may include a telecommunication processor having a microprocessor and a data store for storing robot control software (for example, a Pentium III processor and system board connected with SDRAM, a flash EEPROM, a hard disk drive, or other storage technology). The telecommunication processor may execute telecommunication software for encoding and decoding the VoIP protocol, and may also communicate with a robot system controller (such as, for a non-limiting example, a Roomba R2 controller) via an on-board link (such as an RS232-compatible serial line or USB or an IEEE-1394 connection), in which the system controller performs control of the drive system 130 and other actuators, for example. Also, the telecommunication processor may receive the remote telecommunication data and the robot control signal via the robot wireless transceiver 167, and additionally may receive the local control signal 968 via the local control receiver 168. FIG. 13 illustrates a component organization of a mobile robot in accordance with one example implementation.

When there is conflict between the commands issued by the remote user 400 and the local user 500, the telecommunication processor may arbitrate between the two users by selecting which commands to suppress based on a rule set or priority allocation, for example.

In accordance with at least one example implementation, the telecommunication processor preferentially selects robot control commands from the local user 500 (and discards or ignores robot control commands from the remote user 400) when there is conflict between the local user's commands and the remote user's commands. For example, when the remote user 400 commands the mobile robot 100 to turn right but the local user 500 commands the mobile robot 100 to turn left, the mobile robot 100 would turn left—i.e., obeying the local user's command while ignoring the remote user's command. Alternatively, the telecommunication processor may instead always select the robot control commands from the remote user 400. As another alternative implementation, the mobile robot 100 may permit operation of the privacy button 561 on the RC unit 560 to always override any conflicting command received from the remote terminal 430. As a result, apprehension or privacy concerns on the part of potential users of the robot system may be relieved.

In addition, when the audio mute button 562 is operated on the RC unit 560, the mobile robot 100 may then disable local audio data from being transmitted, while permitting local video data to be communicated to the remote terminal 430. Also, when the video mute button 563 is operated on the RC unit 560, the mobile robot 100 may prevent local video data from being transmitted, while permitting local audio data to be sent to the remote terminal 430.

Figure 8:
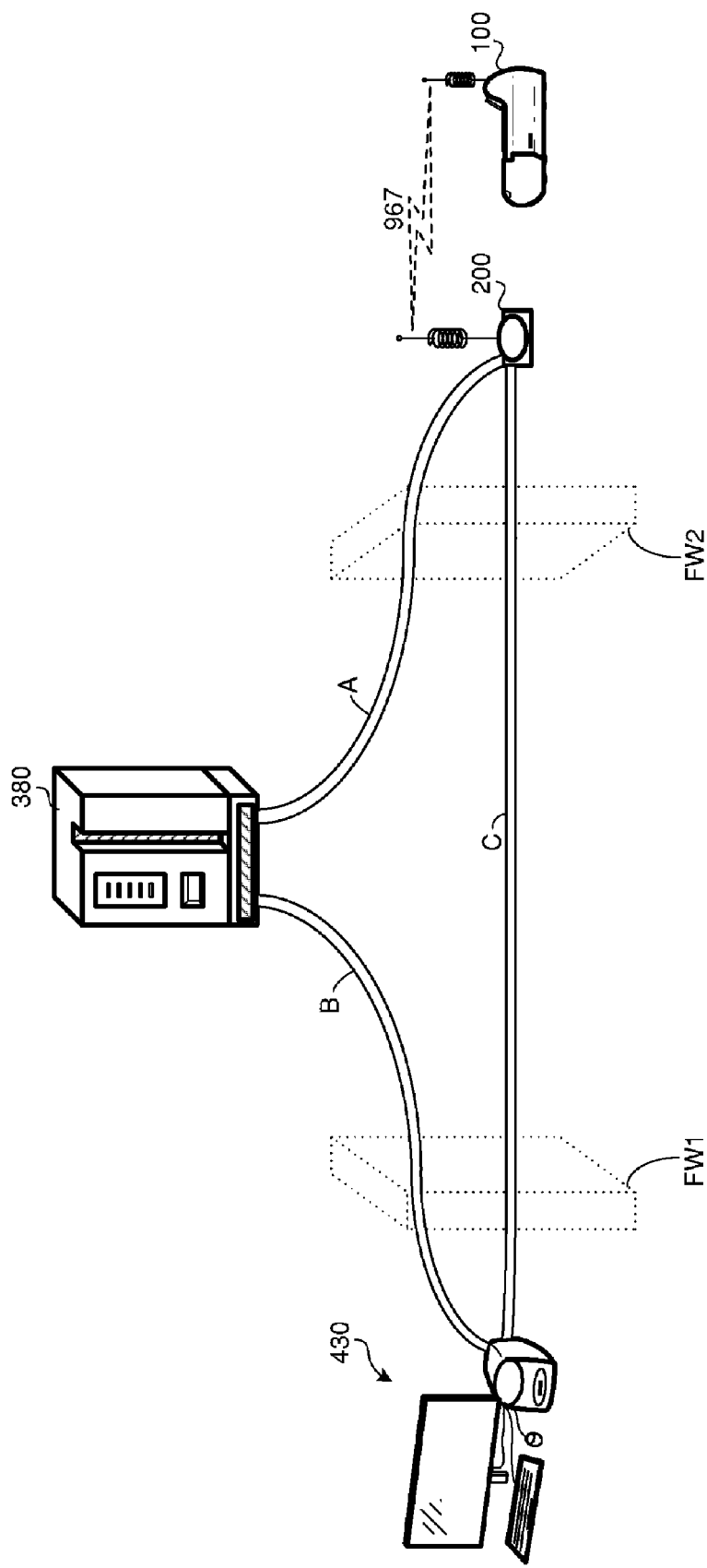
FIG. 8 is a schematic diagram of a robot telecommunication system using direct peer-to-peer VoIP connections.

FIG. 6 illustrates a robot telecommunication system using a peer-to-peer ("P2P") VoIP protocol, in which the base station 200 and the remote terminal 430 are connected to the Internet 901 and both have unique, globally-accessible IP addresses, without a firewall or NAT interposed between the base station 200 or remote terminal 430. In this example implementation, when the remote user 400 operates the remote terminal 430 to connect to the mobile robot 100, the remote terminal initiates a VoIP session with the base station 200 on whichever port is typically used by the VoIP protocol. The telecommunication data may be sent via the directly established VoIP session. Furthermore, the robot control signal from the remote terminal 430 may "piggyback" on the VoIP session; or alternatively, it may instead be transmitted on a second port or separate, unrelated data stream. Although networks in which each Internet-connected host is associated with a unique, globally accessible IP address have grown less common, particularly in home networks, this network configuration nonetheless may function in accordance with the present example. As shown schematically in FIG. 8, direct IP connections are possible between the remote terminal 430 and the base station 200 over link C.

Figure 7:
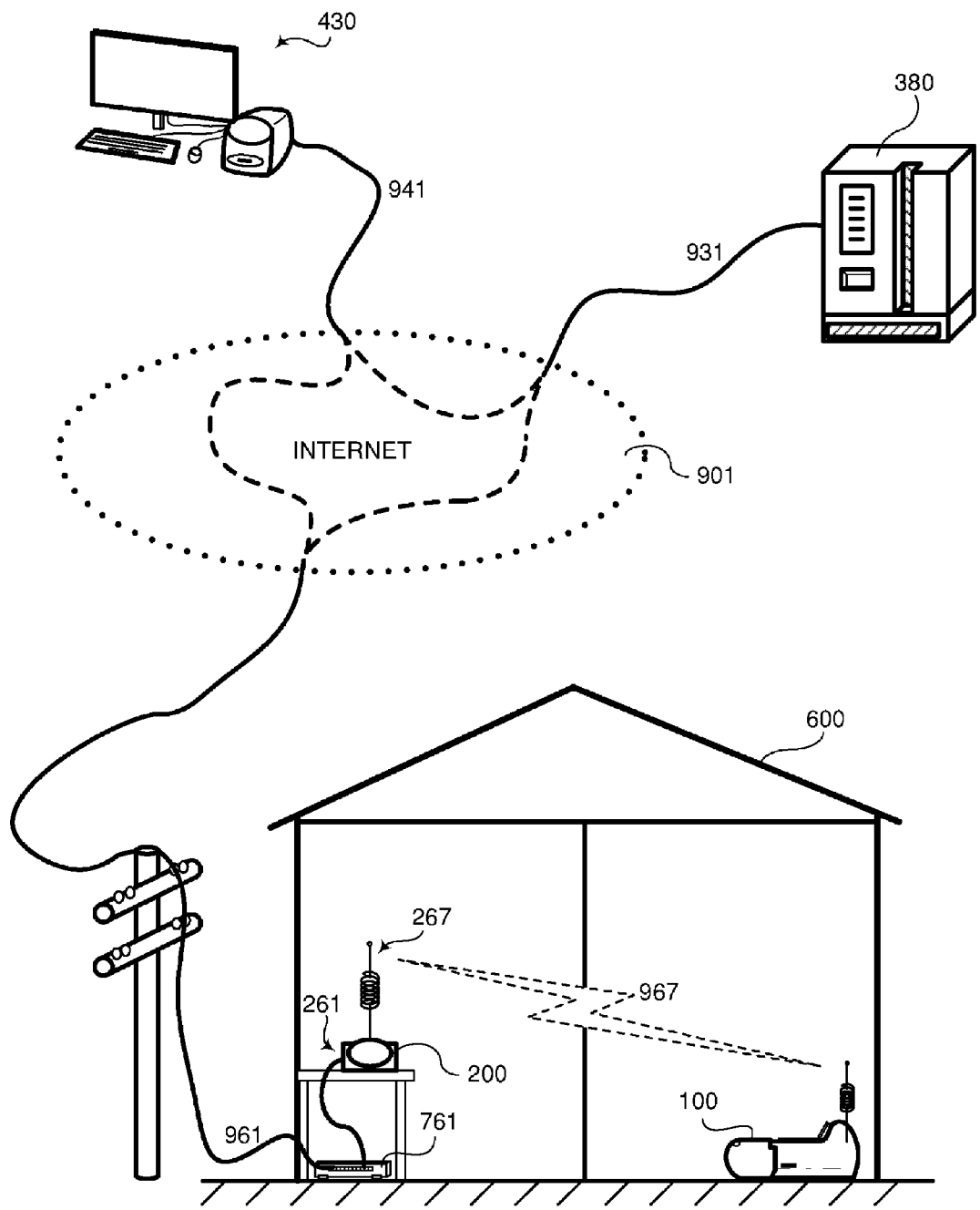
FIG. 7 is an illustrative diagram of a robot telecommunication system using peer-to-peer VoIP connection between a remote terminal and a mobile robot facilitated by an Internet server.

FIG. 7 illustrates another example implementation of a robot telecommunication system, in which a P2P-type VoIP system is used that includes at least one Internet server 380 having a globally accessible IP address. In this example, it is not necessary for the remote terminal 430 or the base station 200 to have a unique, globally-accessible IP address; rather, the remote terminal 430 may be directly connected to the Internet, or may be behind a "cone" NAT; and the base station 200 is connected through a "cone"-type NAT router 761. The NAT router 761 has two IP addresses: the first is a unique, globally accessible IP address used to communicate with Internet hosts via the local premises Internet connection 961, and the second is a non-globally accessible "private" IP address (such as, for example, 192.168.0.1). The NAT router 761 may in turn assign a non-globally accessible private IP address to the base station 200 using DHCP (alternatively, the base station may have a pre-established private IP address).

When the base station 200 transmits IP packets addressed to an Internet host while using the NAT router 761 as an IP gateway, the NAT router 761 re-transmits the base station's outgoing IP packets to the Internet 901 using the NAT router's own unique, globally accessible IP address. For this reason, from the perspective of Internet hosts that are unaware of the base station's NAT status, the base station 200 has an apparent IP address that is the same as the IP address of the NAT router 761.

Figure 9:
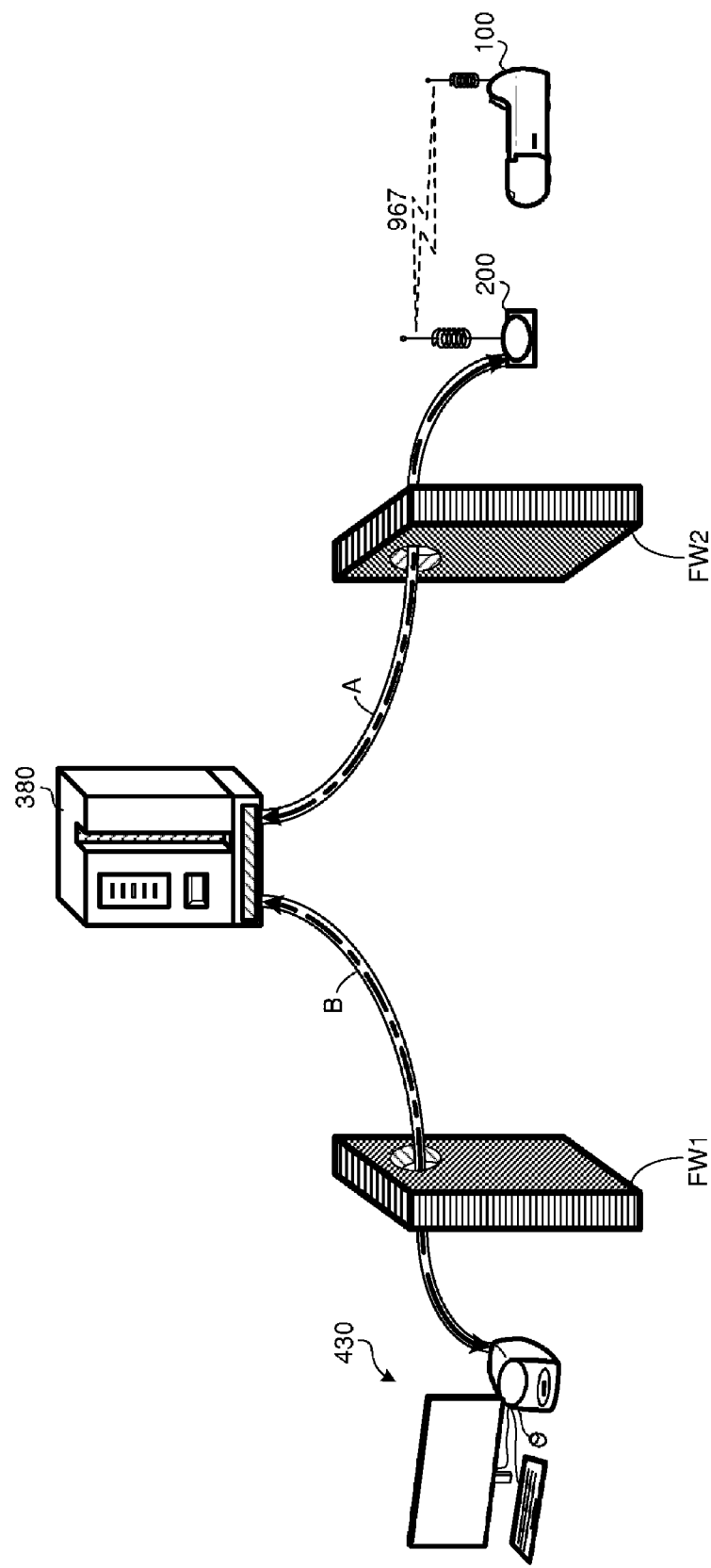
FIG. 9 is a schematic diagram of a robot telecommunication system using peer-to-peer VoIP connections, where the remote terminal and the mobile robot are both behind separate NATs.

As illustrated in FIG. 9, both the remote terminal 430 and also the base station 200 maintain separate connections B, A with the Internet server 380, through respective firewalls FW1 and FW2, that were originally initiated from the respective hosts (since it is not possible for the Internet server 380 to initiate a connection to firewalled hosts such as the base station 200 or remote terminal 430 in this example). When the remote user 400 wants to connect to the mobile robot 100, the remote terminal 430 notifies the Internet server 380 via connection B. When the remote terminal 430 and the base station 200 connect to the Internet server 380, the Internet server 380 may determine the nature of any NAT or firewall status for the hosts (using, e.g., STUN, TURN, or another suitable method for network examination) and determine each connecting host's apparent IP address. The Internet server 380 then notifies the base station 200 via connection A that the remote terminal 430 requests to connect to the base station 200, also informing the base station 200 of the remote terminal's apparent global IP address.

Figure 14:
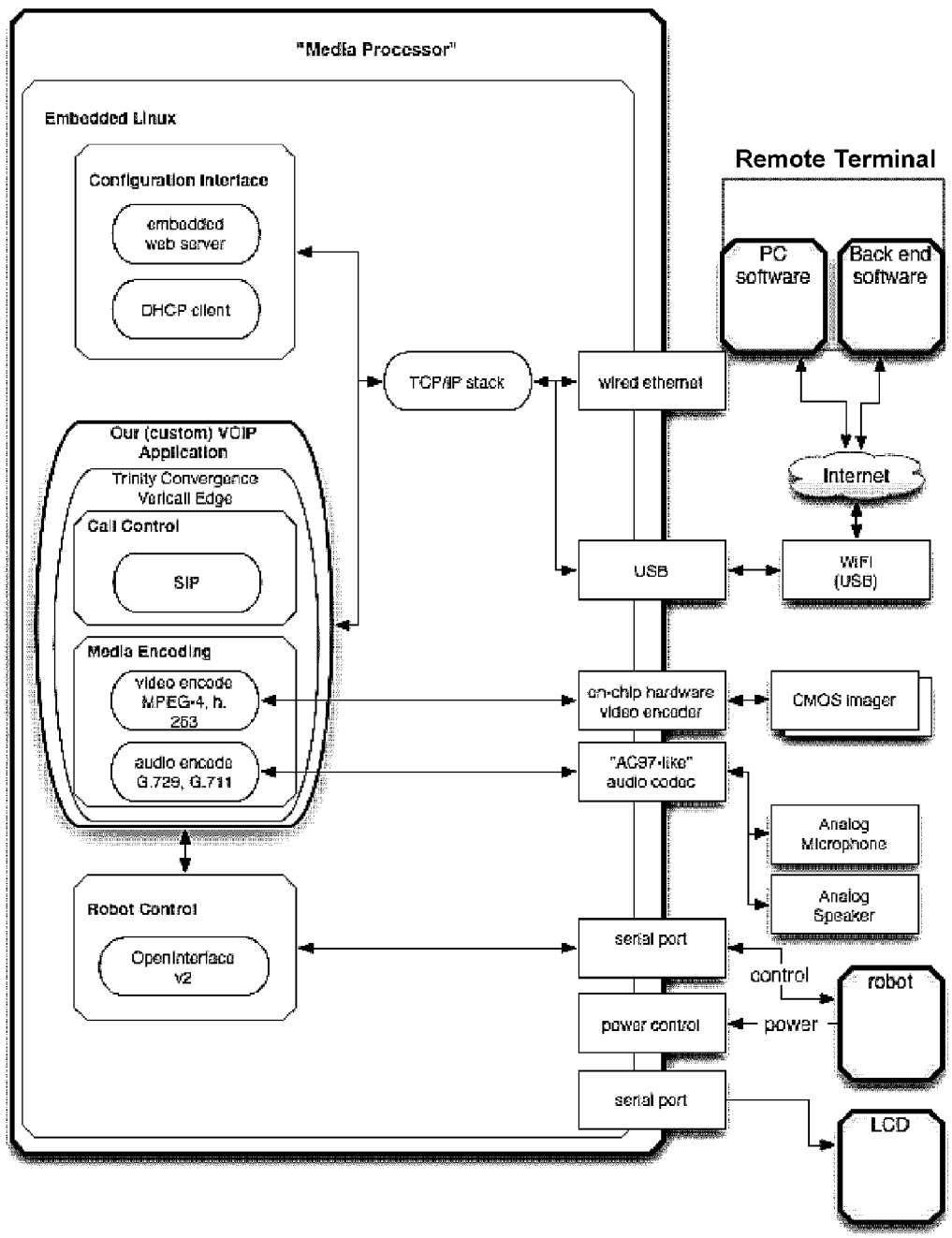
FIG. 14 is a schematic diagram of a software organization of a mobile robot.

FIG. 14 illustrates a possible software organization of a mobile robot system in accordance with at least one example implementation. The VoIP protocol and integration of the remote telecom data signal and the robot control signal into a single VoIP data stream may be performed using a software product such as, for example, VeriCall Edge (see, for example, U.S. Pat. No. 6,985,480 to BROWN, issued Jan. 10, 2006, which is incorporated herein by reference). The robot system may include a media processor, for example.

Figure 10:
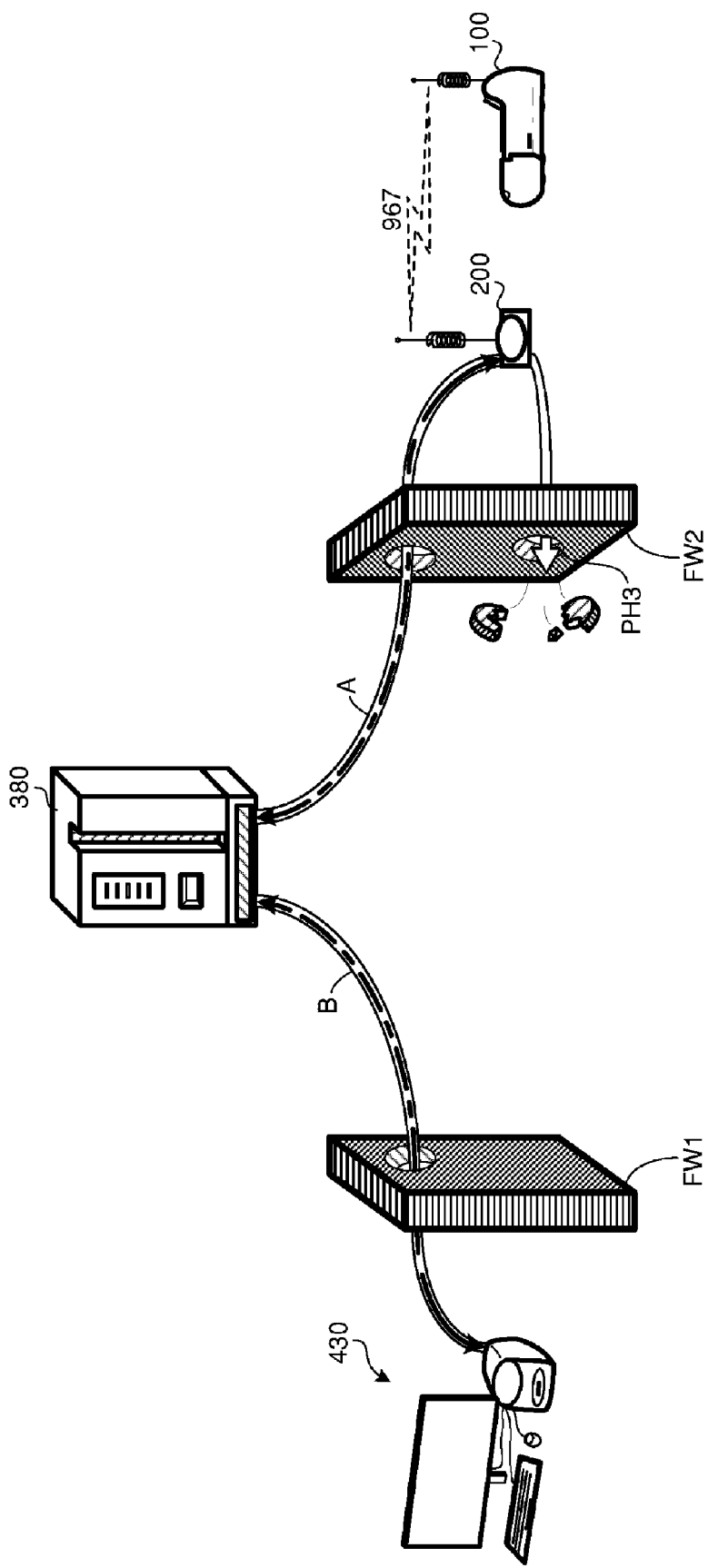
FIG. 10 is a schematic diagram of a robot telecommunication system using peer-to-peer VoIP connections, where the base station is opening a pinhole in the base station's NAT.
Figure 11:
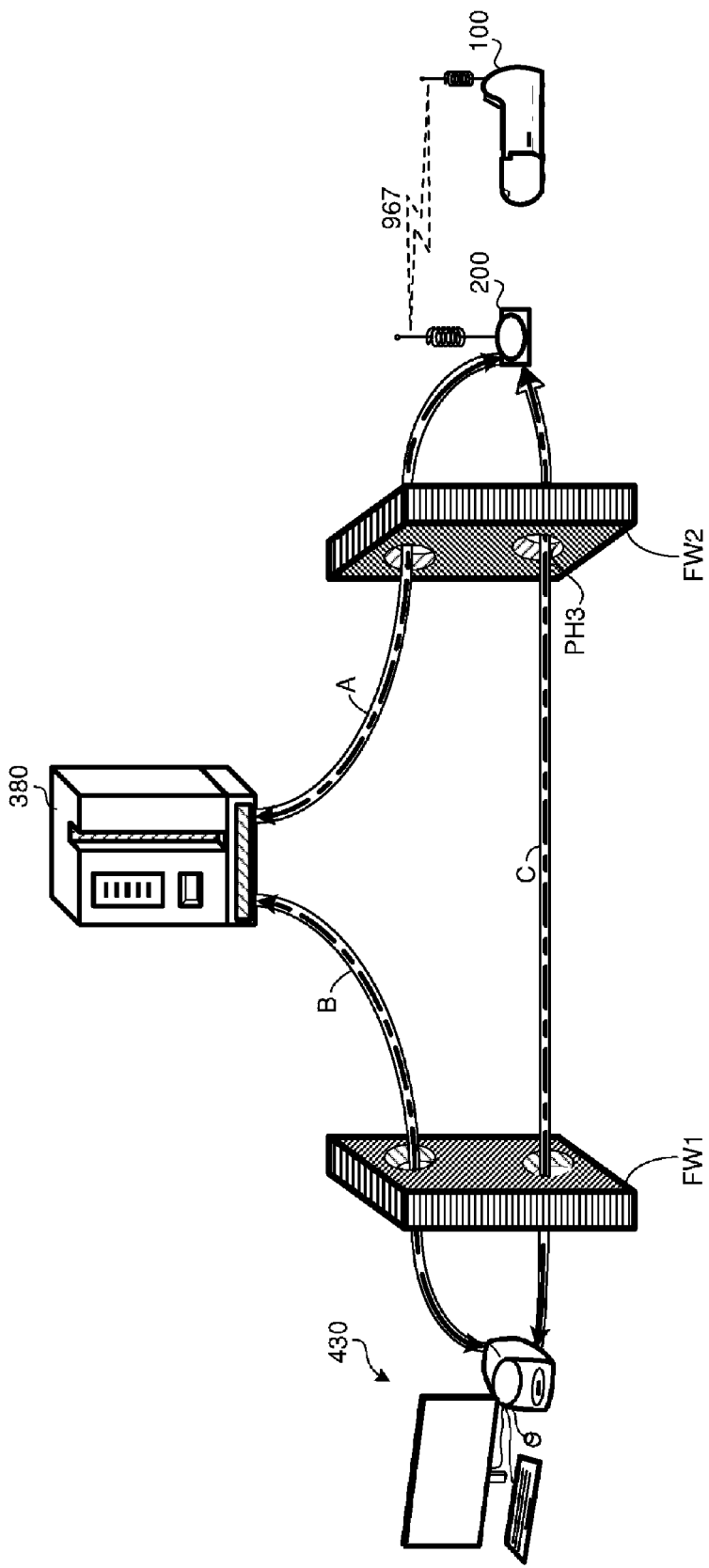
FIG. 11 is a schematic diagram of the robot telecommunication system using peer-to-peer VoIP connections shown in FIG. 10, where the remote terminal connects to the base station through the pinhole opened in the base station's NAT.

The base station 200 then opens pinhole PH3 on a particular UDP port of the base station's NAT by sending an outgoing connection packet to the remote terminal's apparent IP address, as shown in FIG. 10. As illustrated in FIG. 11, the remote terminal 430 then connects to the base station 200 by establishing connection C through the pinhole PH3.

In some network arrangements—such as when a symmetric NAT is interposed between the remote terminal 430 and the base station 200—it may not be possible to determine which apparent IP address or port the remote terminal 430 will have, and therefore it may not be possible for the base station 200 to open an appropriate pinhole through which the remote terminal 430 can connect. Nonetheless, it may be possible for the remote terminal 430 and the base station 200 to communicate over the P2P VoIP protocol by employing a relay or TURN server.

Figure 12:
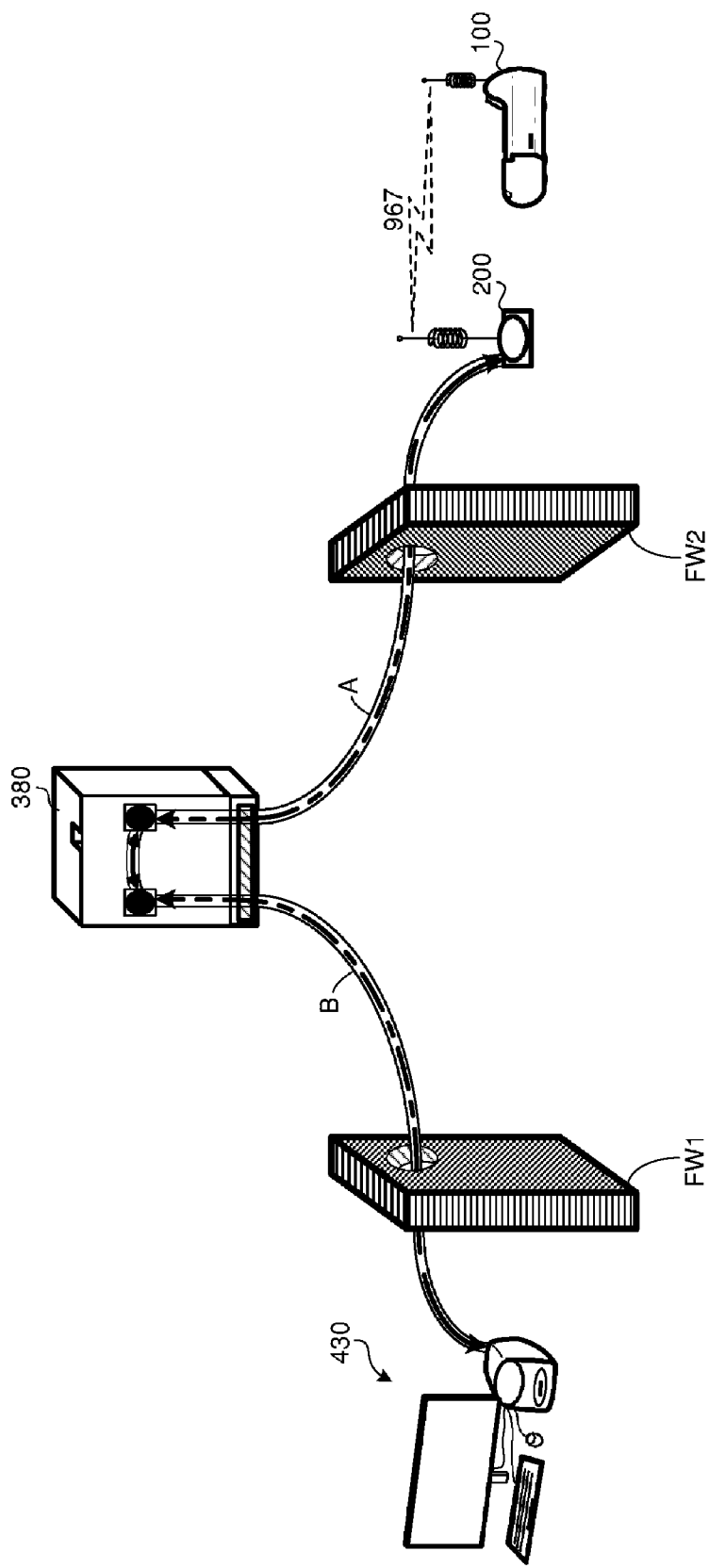
FIG. 12 is a schematic diagram of a robot telecommunication system using an Internet server operating as a relay server for a VoIP connection between the remote terminal and the mobile robot.

In accordance with the example implementation shown in FIG. 12, the Internet server 380 functions as a relay server to enable VoIP data to be exchanged between the remote terminal 430 and the base station 200. In this example implementation, the Internet server 380 first determines the NAT status of the remote terminal 430 and the base station 200 when they first connect to the Internet server 380. The Internet server 380 then determines an optimal connection strategy and coordinates the hosts to effect the VoIP connection.

As one example, when the Internet server 380 determines that the remote terminal 430 and the base station 200 are both behind "cone" NATs, the Internet server 380 may determine that the optimal connection strategy is for the base station 200 to open a pinhole (e.g., PH3 shown in FIG. 11) and for the remote terminal 430 to connect through the pinhole. Alternatively, if the Internet server 380 detects a symmetric NAT between the remote terminal 430 and the base station 200, it may determine that use of a relay or TURN server is necessary.

Then, for example, in an implementation using a SKYPE network, the Internet server 380 may designate a "super node" (e.g., a node that is not behind a NAT or firewall) for the hosts to use as a relay server. As illustrated in FIG. 12, the Internet server 380 itself may also function as a relay server, for example (alternatively, the relay server may be another Internet host separate from the Internet server 380). When communicating via a relay server, there need not be any direct connection between the remote terminal 430 and the base station 200.

Poor quality of service ("QoS") may affect the ability of the remote user 400 to effectively control the mobile robot 100 and/or to conduct effective telecommunication with the local user 500. Accordingly, the Internet server 380 may measure and/or monitor QoS of the VoIP connection between the remote terminal 430 and the mobile robot 100, and may select relay servers (or connection strategy recommendations) based on the QoS metric. For example, when the VoIP protocol being used is SIP, the Internet server 380 may measure QoS using the RTCP protocol. If the QoS is determined to be poor, then the Internet server 380 may notify the remote terminal 430 and the base station 200 to attempt to connect via a different relay server or to attempt a different connection strategy.

Figure 26:
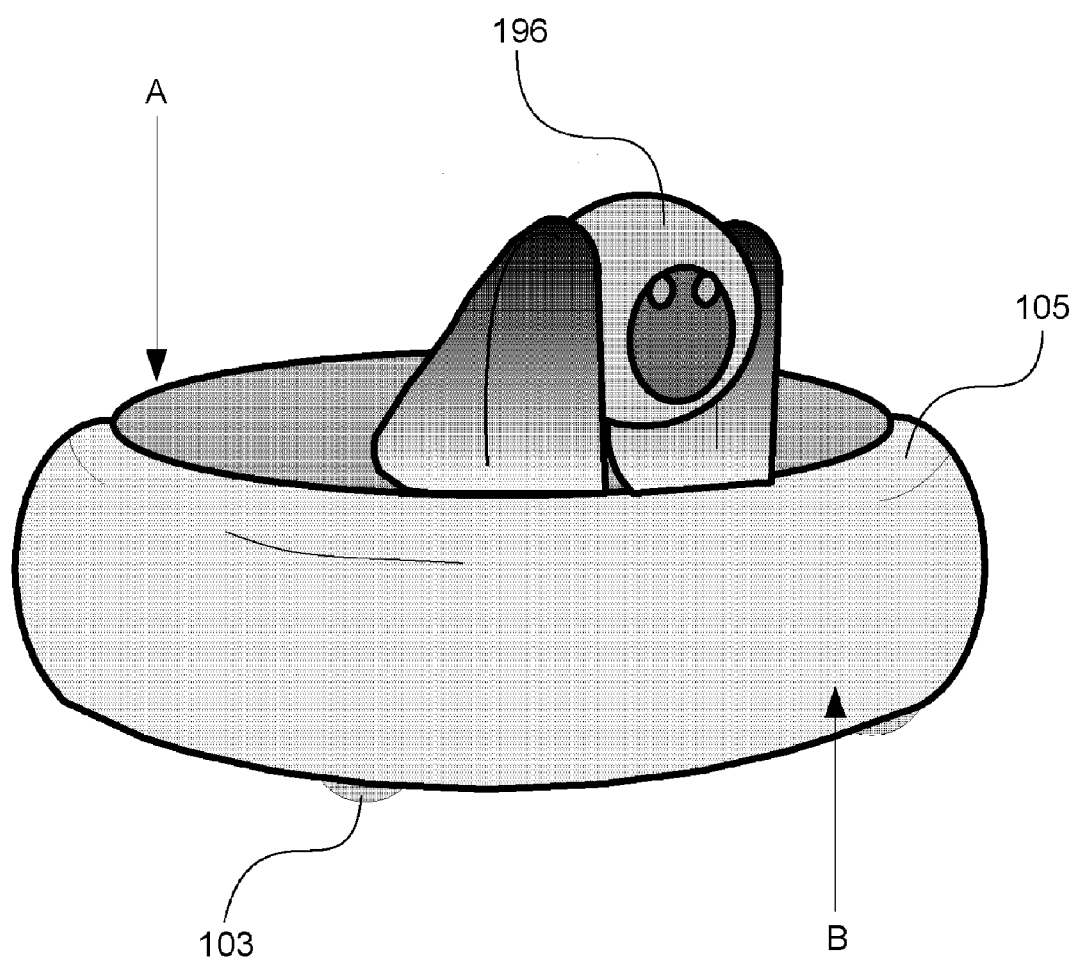
FIG. 26 is a perspective view of a mobile robot having a rotatable, reversible robot camera.

FIG. 26 shows an example implementation of a mobile robot 100 having a rotatable robot camera 196 mounted on a turret, in which the robot camera 196 is rotatable from a forward-facing position (the forward direction of the chassis 105 being indicated by the arrow "A") to a rear-facing position (the rear direction of the chassis 105 being indicated by the arrow "B"). In accordance with at least one implementation, the rotatable robot camera 196 is operable even when rotated to the rear-facing position (see FIG. 26).

When the mobile robot 100 having this type of robot camera 196 is recharging or connected to a base station 200, the mobile robot 100 may typically be oriented such that the front end "A" of the chassis 105 faces a wall or is obstructed from rotating the chassis 105. Yet the mobile robot 100 can still enable a remote user 400 to receive local image data from the rotatable robot camera 196, as illustrated in FIG. 26, by rotating the robot camera 196 so as to face the rearward direction "B".

In accordance with one example implementation, when the robot camera 196 flips by 180 degrees so as to switch between the forward- and rear-facing directions, the mobile robot 100 automatically adjusts the output signal to compensate for the flipped view of the robot camera 196.

Figure 23:
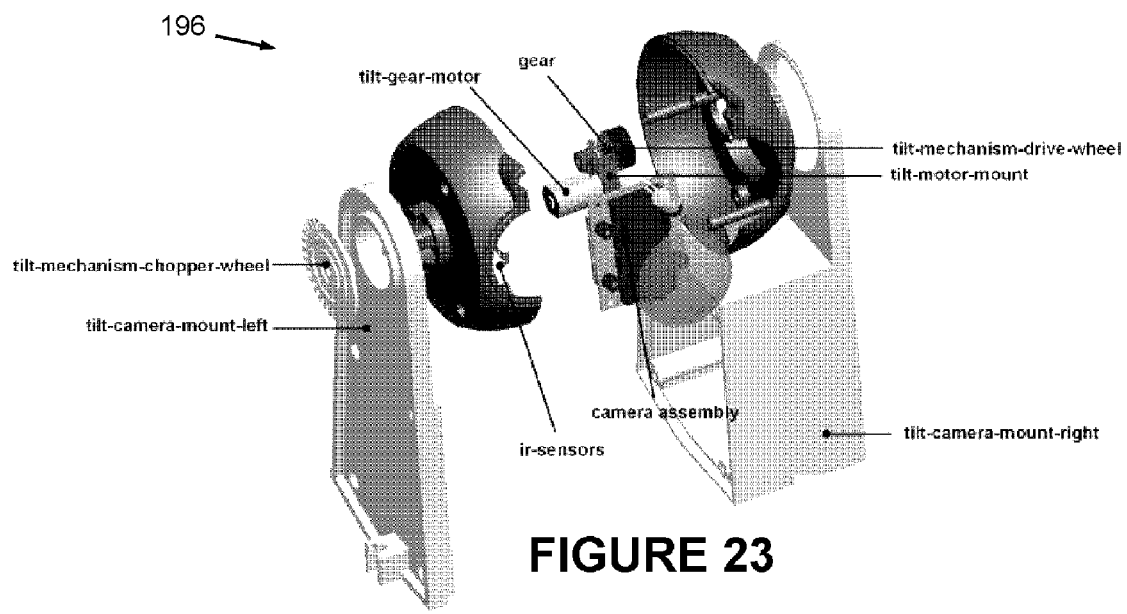
FIG. 23 is a partial cutaway exploded view of a robot camera having a motorized tilt and zoom mechanism operable by a remote user.
Figure 24:
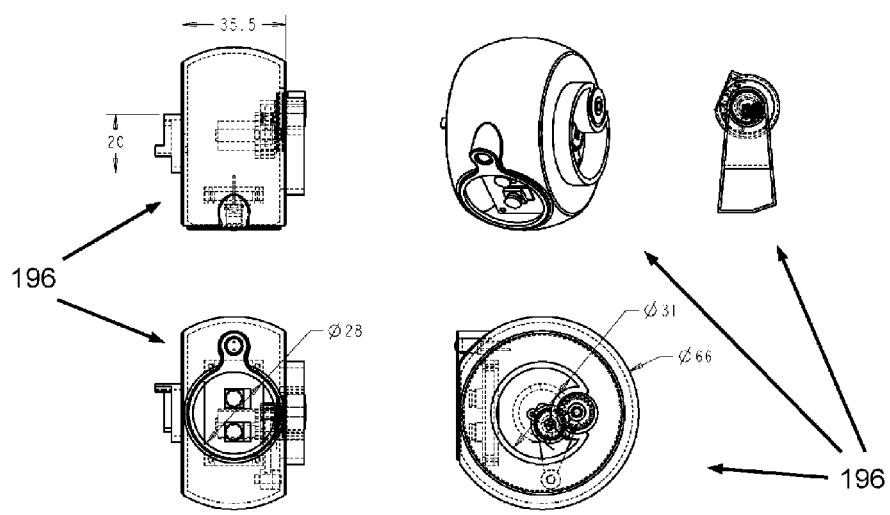
FIG. 24 is a series of isometric diagrams of the robot camera of FIG. 23.

As shown in FIGS. 23 and 24, the rotatable robot camera 196 may include a tilt mechanism, including a tilt gear motor and gears for adjusting the angular position of the robot camera 196.

Figure 27:
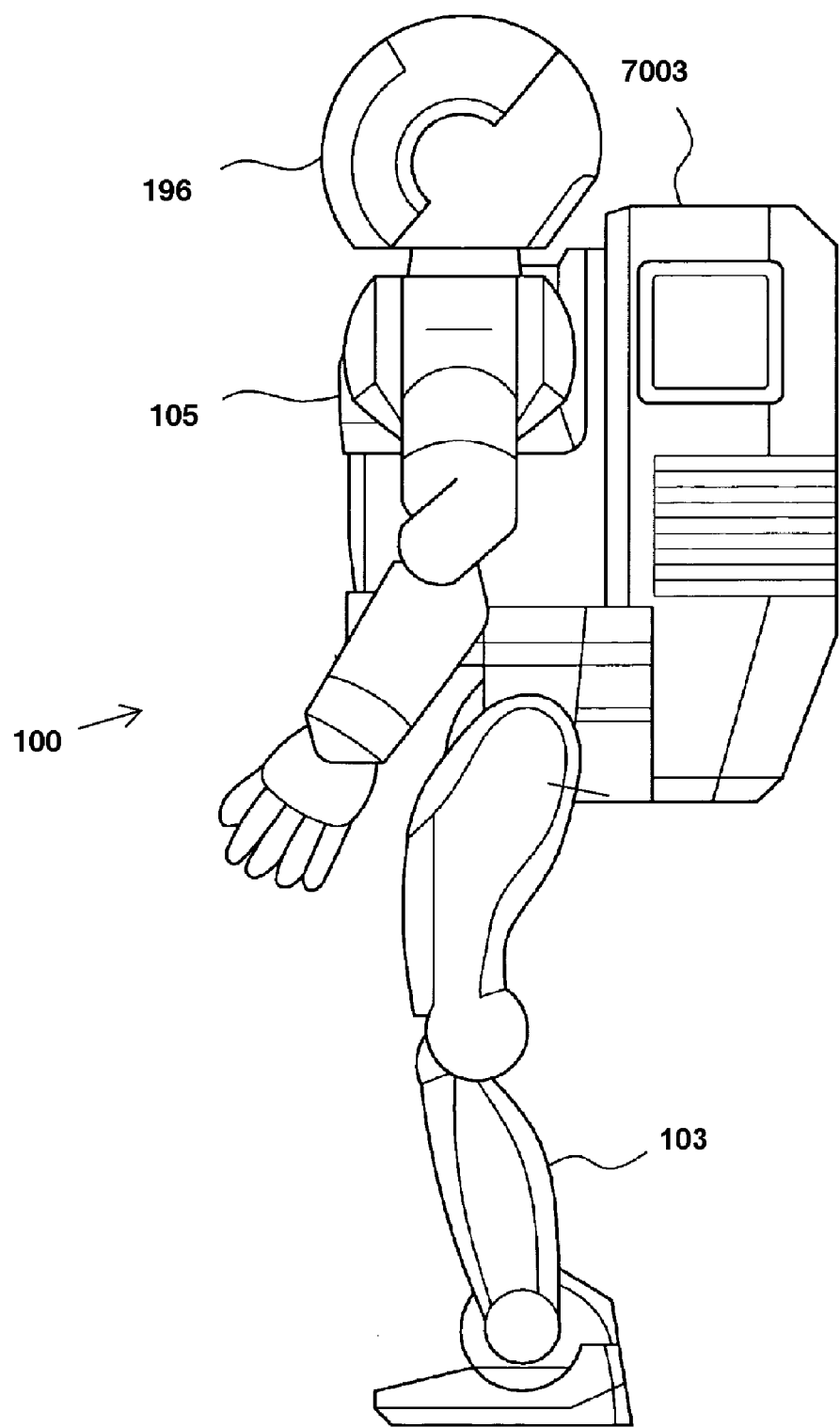
FIG. 27 is a profile view of a mobile robot having an example alternative drive system including bipedal legs.

FIG. 27 illustrates an example implementation of a mobile robot 100, in which the mobile robot 100 has a walking-type mobility platform 103. The walking-type mobility platform 103 may include a bipedal leg-type drive system (see, for example, US Patent Application Publication 2006/0249314 to TAKENAKA, published Nov. 9, 2006, US Patent Application Publication 2005/0151496 to FURUTA, published Jul. 14, 2005, and US Patent Application Publication 2004/0027086 to OGAWA, published Feb. 12, 2004, each of which are incorporated herein by reference). Alternatively, the drive system may include a tread track-type mobility platform (such as used with the iRobot PackBot, as a non-limiting example), an insect-leg-type mobility platform, or any other mobility platform suitable for propelling the mobile robot 100. Also, the mobile robot 100 may include a component housing 7003 to contain the telecommunication processor, the wireless network transceiver, or other components.

Figure 19:
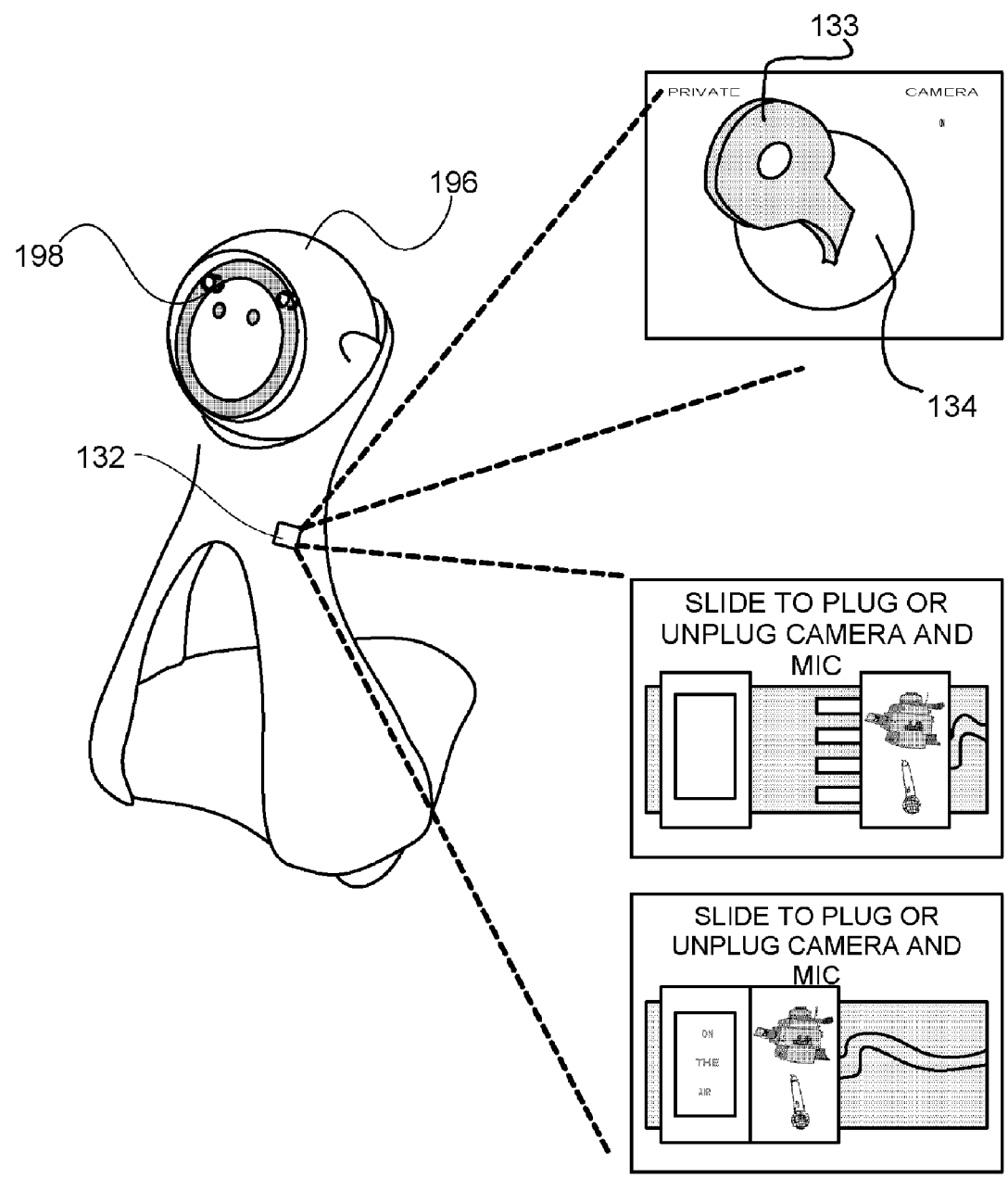
FIG. 19 is a partially exploded detail view of a mobile robot having a lock-and-key mechanism for toggling privacy mode, and a slidable privacy mechanism for preventing transmission of telecommunication data.

FIG. 19 illustrates a robot camera 196 that can be placed into the privacy mode using a key 133 inserted into a 134, in which turning the key 133 toggles the position of the robot camera 196 from enabled mode to the privacy mode. When the robot camera 196 is in the privacy mode position, the backstop 199 (see FIGS. 17 and 18) obstructs the view of the robot camera 196. Further, the privacy position of the robot camera 196 provides visible assurance to users that the robot camera 196 cannot send out visual observation of the mobile robot's surroundings.

Figure 25:
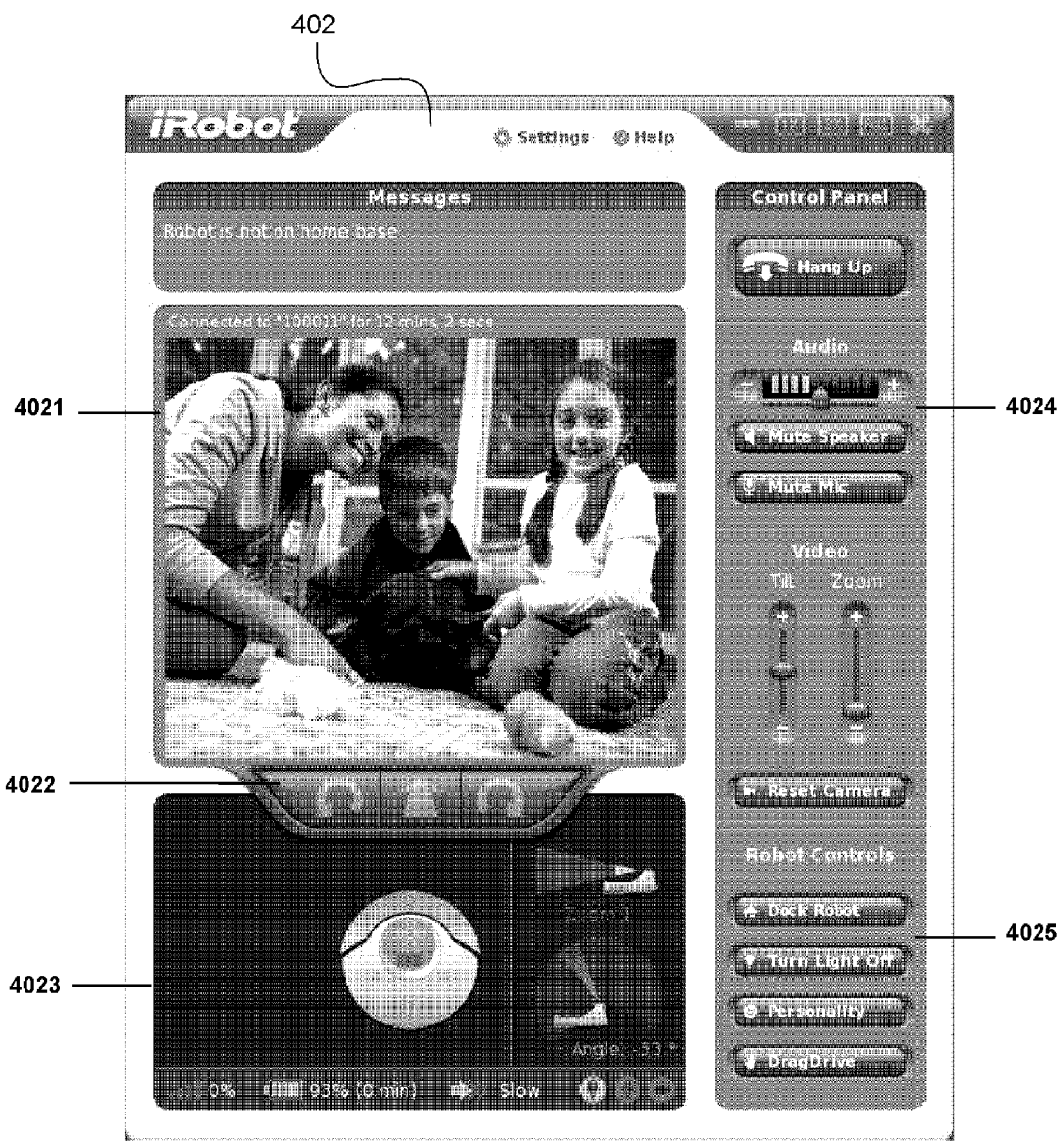
FIG. 25 is a screen shot of a remote user interface for using a mobile telecommunication robot.

FIG. 25 illustrates an example implementation of a remote user interface 402 provided to the remote user 400 at the remote terminal 430. In the remote user interface 402 is a camera window 4021 which shows the real-time video data sent from the robot camera 196. Clickable navigation icons 4022 permit the remote user 400 to navigate the mobile robot 100 by placing the screen cursor onto an icon representing a desired direction of turning (or straight ahead) and then clicking the mouse 438, for example. A robot control panel 4025 includes buttons for sending a robot control signal to control various robot functions, while the telecommunication windows 4024 includes indicators of current call status and also icons for controlling the initiation, termination, etc., of the telecommunication functionality of the mobile robot 100. A robot status window 4023 indicates the mode of operation (viewing angle, currently selected camera, etc.) of the robot camera 196.

In accordance with one example implementation, the mobile robot 100 may include a rotatable robot camera 196 that can rotate between Software Component Organization As one example of a telecommunication robot system, a mobile robot 100 and a remote terminal 430 (e.g., soft-phone) communicate over the Internet 901. To facilitate a reasonable user experience for the remote user 400, a back-end infrastructure is provided, such as the Internet-connected server 380, which performs matchmaking, facilitates NAT traversal and ties customer and account management to the existing customer relationship management services. In addition, the back-end infrastructure introduces product subscriptions, remote robot user interfaces, persistent robot history, and online software releases.

Figure 28:
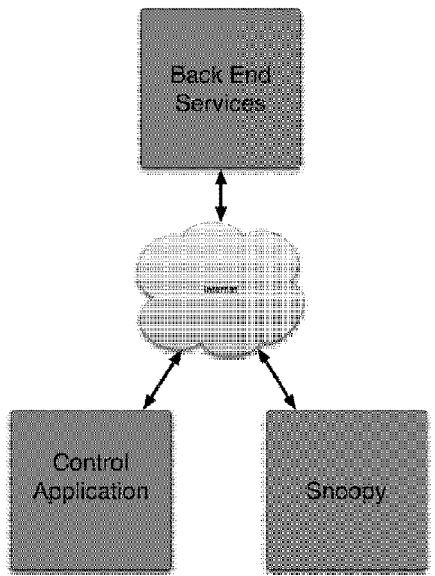
FIG. 28 is a schematic diagram illustrating a network component organization of a mobile telecommunication robot service.
Figure 29:
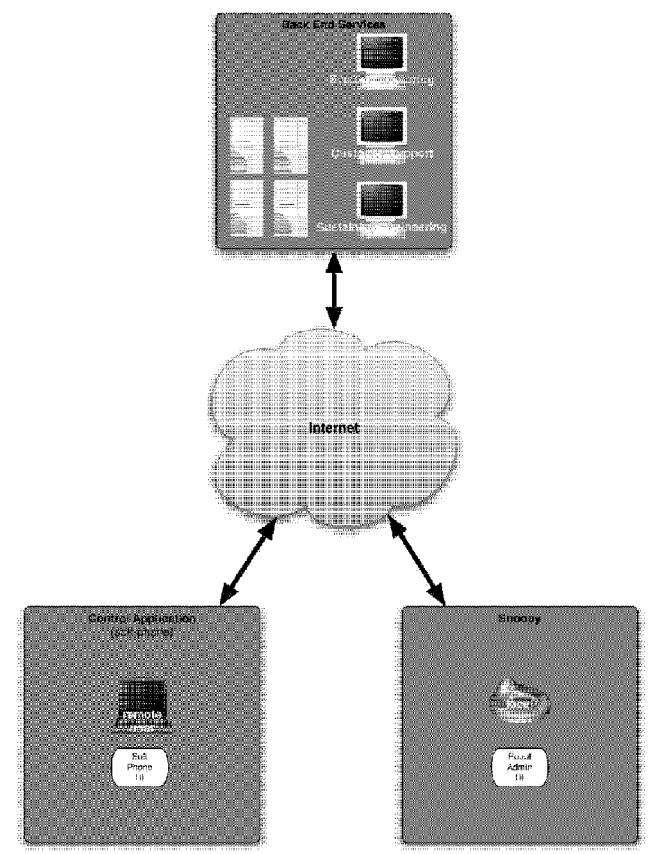
FIG. 29 is another schematic diagram illustrating a network component organization of a mobile telecommunication robot service.
Figure 30:
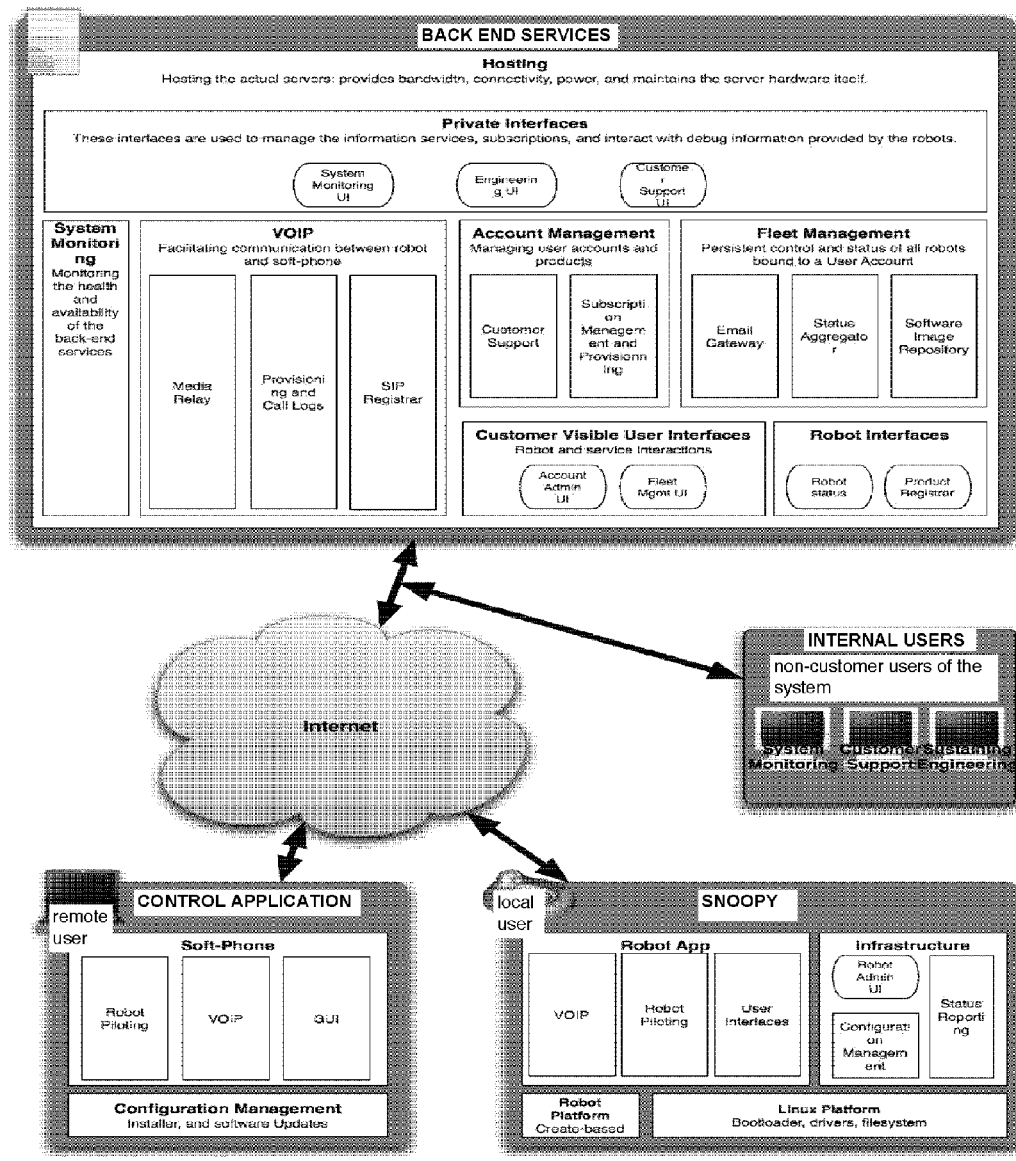
FIG. 30 is a schematic diagram illustrating a software component organization of a mobile telecommunication robot system.

In accordance with at least one example implementation, the back-end infrastructure: provides a SIP registry for all robots and users, providing a location-free global address space for easier calling; facilitates firewall traversal such that users are not required to endure home networking configuration; allows owners to interact with online customer support by tying the SIP domain and product registration to iRobot's existing customer support infrastructure; acts as a gateway for extended product status, such as "robot stuck" messages and call history inappropriate or impossible to communicate directly by the robot; hosts software images (and release notes) for the product; and provides an environment to stage and deploy these and other new services enabled by a remote presence in the home The following discussion relates to the example component organizations illustrated in FIGS. 28 and 29.

In FIGS. 28 and 29, a conceptual view is provided of the system based on the three software platforms: "Snoopy," "Control Application," and "Back End Services." The "Control Application," or soft-phone is a software application that a customer (such as the remote user 400) installs on a PC (such as the remote terminal 430) to interact with his or her mobile robot 100 directly. This may include, for example, a binary application for Windows XP, bundled with the product. The "Snoopy" block refers to the software components of the mobile robot 100, executed on the telecommunication processor. This may include robot control software, a VoIP application, device drivers, and/or an embedded Linux software environment. The mobile robot 100 may also include an embedded web server and web interface used to configure the mobile robot 100 (e.g., via the tether interface 165).

The "Back End Services" run on one or more servers in a hosted environment, in accordance with one example implementation. These servers (e.g., the Internet server 380) introduce additional interfaces for maintaining the software services bundled with the product. The back-end infrastructure simplifies address lookups, facilitates firewall traversal, and adds remote robot monitoring capabilities. Internally, the infrastructure also provides customer and account management and service performance information. The following are examples of back end services in accordance with at least one implementation:

Private Interfaces

Private interfaces are used internally or by our vendors to diagnose and manage mobile robots 100 in the field and the back-end infrastructure itself.

System Monitoring UI

It is assumed that all software components will provide mechanisms for service health monitoring. An associated user interface will be used by our hosting provider to maintain the infrastructure. The software may include monitoring functionality such as SNMP agents. The date may be aggregated into a single user interface or dashboard that can be used by the hosting vendor to maintain the servers. In addition, remote access to this information may be provided.

Engineering UI

Product development teams may interact with an Engineering UI service to determine appropriate over-subscription ratios and understand customer usage patterns.

Customer Support UI

This user interface may be used by customer support when diagnosing robot and/or networking issues. This user interface may include service level status, robot status, VOIP status, and subscription account information.

System Monitoring

This information is used by the hosting provider to gauge system health. This information is rendered into the "System Monitoring UI." For example, a network accessible syslogd server, SNMP monitor, or similar software monitoring/logging system may be provided.

Media Relay

As discussed above with regard to the Internet server 380, the server 380 may function to perform relaying of UDP traffic (e.g., VoIP datagrams) between the remote terminal 430 and the mobile robot 100, allowing communication through firewalls. As one non-limiting example, a software product such as MediaProxy may be executed on the server 380 to provide this functionality, and may report its status via SOAP/XML or other suitable system.

Provisioning and Call Logs

In accordance with one non-limiting example implementation, a mobile robot 100 may be marketed with two bundled messaging accounts. In addition, additional users may be associated with an account such that multiple family members can each have their own soft-phone installation (for example, the functionality may be provided by executing a software product such as NGN-Pro for provisioning and/or CDRTool for call records, inter alia). This information may also be correlated to an existing customer database schema.

SIP Registrar

The directory service for robot and soft-phone phone numbers. As a benefit, the user may be shielded from technical complexities such as IP addresses and/or hostnames. As a non-limiting example, such functionality may be provided by executing a software product such as OpenSER to maintain an SIP domain.

Customer Support

Customer support may enable restricted access to subscription account information in order to troubleshoot messaging and account issues.

Subscription Management

Users may be enabled to self-manage (pay, cancel) their own messaging accounts.

Email Gateway

May be used to notify users of scheduled downtime. For example, when triggered by the status aggregator, this gateway may automatically notify the corresponding e-mail address with troubleshooting and/or intervention requests. This gateway may also be used to notify users of service-related issues.

Status Aggregator

This application may receive periodic status updates from the mobile robot 100, and uses this information to populate a database for use by customer support and the fleet manager UI. Interoperability with existing infrastructure such that robot status (e.g., battery voltage) can be seen via the web-based fleet management interface, for example.

Software Image Repository

Software updates will be hosted by our infrastructure. This will be used by customers to update robot, media board, and soft phone software.

Robot Interfaces may be provided as HTTP-based interfaces for robot to back-end communication:

Robot Status

The mobile robot 100 may use this secure link to receive status updates for robots in the field. The application decodes and publishes status to persistent storage (e.g., a relational database) for use by the various user interfaces.

Product Registrar

The product registrar receives configuration information from the mobile robot 100 when a robot owner configures his or her mobile robot 100 and messaging account. This CGI application decodes and pushes this data to the other services to register a subscription, and provision a SIP address, for example. The CGI application may update a global customer record with product and subscription information, for example.

Robot Administrator UI

This is a web-based user interface used for initial configuration and occasional administration. This interface may be limited to the local user, but does display basic status. For example, the interface may be provided by an embedded webserver (running a suitable http server such as, e.g., thttpd) on the telecommunication processor of the mobile robot 100.

Example Use Scenarios

The following are brief example use scenarios:

Out of Box Experience

Initial experience for a new customer:

1. User configures mobile robot 100 using Account Admin UI served by the mobile robot 100, using his/her global iRobot account credentials.

2. User submits form on the mobile robot 100, which then relays portions of the data to the Product Registrar.

3. Product Registrar validates customer account, registers the mobile robot 100 and binds a subscription to it.

4. Product Registrar provisions accounts for the mobile robot 100 and soft-phone (e.g., the remote terminal 430) with SIP Registrar.

5. Product Registrar returns success to Robot Admin on the mobile robot 100.

6. Robot Admin indicates success to user, and has Configuration Management notify the Robot Application of the configuration changes.

7. User installs soft-phone and dials first call to the robot.

8. The soft-phone VOIP stack contacts the SIP registrar, which validates the soft-phone and returns the address information of the robot.

9. The soft-phone VOIP stack contacts the robot application and establishes a call.

10. Audio and video begins streaming between robot and soft-phone. These streams pass through the Media Relay.

11. Provisioning and Call Logs logs the call (but not the data).

Account Provisioning

User wants to register another account for her husband:

1. User logs into Account Admin UI and adds another SIP number and password to the robot subscription.

2. Information is forwarded to SIP Registrar.

3. Later, husband downloads soft-phone installer from Software Image Repository and installs on his desktop.

4. Husband uses the new SIP credentials to login to Snoopy. He has to enter PIN number as given to him by user (this information is not stored by iRobot).

Robot Stuck

The mobile robot 100 gets stuck and cannot find its way back to the base station/dock 200:

1. Robot Platform decides it has tried too long to find the dock. It notifies Robot App, which spawns a message using the robot's Status Reporting module.

2. Status Reporting sends HTTP POST to Robot Status module on back-end.

3. Robot Status updates database.

4. The database update triggers an Email Gateway to notify the main user.

5. Email Gateway looks up the paired email account from the Customer Support module and sends a message to that user: "Robot could not find dock, please login and drive to dock."

Robot Diagnostics and Customer Support

Mobile robot 100 has failed—it could not reach the dock or base station 200 and has since lost power, and the user missed the email notifications from the mobile robot 100:

1. Remote user 400 tries calling the mobile robot 100, but fails.

2. The remote user 400 contacts customer support (via web, soft-phone, or telephone, as non-limiting examples).

3. Customer support contact opens Customer Support UI and enters global account login for remote user 400.

4. Customer support queries Subscription Management and Provisioning for subscription status. Subscription is valid.

5. Customer support queries Provisioning and Call Logs to examine call records. No unusual loss of networking or error codes detected.

6. Customer support queries Status Aggregator and finds stuck, and power down messages from the mobile robot 100.

7. Customer support instructs the remote user 400 about the failure and logs the call.

8. Customer calls home and has mobile robot 100 put on dock.

Although various example implementations have been discussed hereinabove, the claimed subject is not limited necessarily thereto. Rather, the claimed subject matter relates to the features of the accompanying claims and their equivalents.

What is claimed is:

1. A remote control (RC) unit configured to wirelessly control a mobile robot having a robot camera, comprising:
 a privacy button operable by a local user and configured to engage a privacy mode of the mobile robot; and
 an infrared transmitter configured to emit an infrared control signal to the mobile robot based on input from a keypad of the RC unit,
 wherein the infrared control signal is configured to cause the robot camera to change position to block the field of view of the camera such that the environment of the mobile robot, other than the robot's body, is obscured when the privacy mode is engaged.

2. The RC unit according to claim 1, further comprising an RC microphone configured to generate RC sound data,
 wherein the infrared control signal includes the RC sound data, and the RC sound data is transmitted to a remote user of the mobile robot.

3. The RC unit according to claim 1, further comprising:
 an audio mute button configured to stop transmission of sound data from the mobile robot to a remote user; and
 a video mute button configured to stop transmission of video data from the mobile robot to the remote user.

4. The RC unit according to claim 1, further comprising:
 a sliding cover shiftable between an open position and a closed position,
 wherein the sliding cover covers at least one button when the sliding cover is in the closed position,
 wherein the at least one button is exposed when the sliding cover is in the open position, and
 wherein the privacy button is exposed both when the sliding cover is in the open position and also when the sliding cover is in the closed position.

5. The RC unit of claim 1, wherein the infrared control signal is configured to disable one or more of a microphone and a speaker at the mobile robot when the privacy mode is engaged.

6. The RC unit of claim 1, wherein the infrared control signal is configured to prevent data generated by a microphone of the mobile robot from being transmitted to a remote terminal.

7. A remote control (RC) unit configured to wirelessly control a mobile robot having a robot camera, comprising:
 an input device operable by a local user and configured to engage a privacy mode of the mobile robot; and
 a transmitter configured to emit a control signal to the mobile robot based on input from the input device of the RC unit,
 wherein the control signal is configured to cause the robot camera to change position to block the field of view of the robot camera such that the environment of the mobile robot, other than the robot's body, is obscured when the privacy mode is engaged.

8. The RC unit according to claim 7, further comprising an RC microphone configured to generate RC sound data,
 wherein the control signal includes the RC sound data, and the RC sound data is transmitted to a remote user of the mobile robot.

9. The RC unit according to claim 7, further comprising:
 an audio mute button configured to stop transmission of sound data from the mobile robot to a remote user; and a video mute button configured to stop transmission of video data from the mobile robot to the remote user.

10. The RC unit according to claim 7, further comprising:
a sliding cover shiftable between an open position and a closed position,
wherein the sliding cover covers at least one button when the sliding cover is in the closed position,
wherein the at least one button is exposed when the sliding cover is in the open position, and
wherein the privacy button is exposed both when the sliding cover is in the open position and also when the sliding cover is in the closed position.

11. The RC unit according to claim 7, wherein the transmitter is an infrared transmitter configured to emit an infrared control signal to the mobile robot.

12. The RC unit according to claim 7, wherein the transmitter is a radio frequency transmitter configured to emit a radio frequency control signal to the mobile robot.

13. The RC unit according to claim 7, wherein the transmitter is a light emitting diode (LED) configured to emit a visible light control signal to the mobile robot.

14. The RC unit according to claim 7, wherein the control signal is configured to disable one or more of a microphone and a speaker at the mobile robot when the privacy mode is engaged.

15. The RC unit of claim 7, wherein the control signal is configured to prevent data generated by a microphone of the mobile robot from being transmitted to a remote terminal.

16. A method of controlling a mobile robot having a robot camera, the method comprising:
receiving an input at an input device of a remote control (RC) unit to engage a privacy mode of the mobile robot;
emitting a control signal to the mobile robot based on input from the input device to engage the privacy mode; and
in response to receiving the emitted control signal at the mobile robot indicating that the privacy mode is engaged, moving the robot camera into a conspicuously disabled orientation.

17. The method of claim 16, wherein moving the robot camera comprises changing a position of the robot camera to block the field of view of the robot camera such that the environment of the mobile robot, other than the robot's body.

18. The method of claim 16, further comprising disabling one or more of a microphone and a speaker at the mobile robot in response to receiving the emitted control signal indicating that the privacy mode is engaged.

19. The method of claim 16, further comprising preventing data generated by a microphone of the mobile robot from being transmitted to a remote terminal in response to receiving the emitted control signal indicating that the privacy mode is engaged.

20. The method of claim 16, further comprising overriding a conflicting command for the mobile robot received from a remote terminal when the input is received at the input device at the RC unit to engage the privacy mode of the mobile robot.

* * * * *